United States Patent
Lee et al.

(10) Patent No.: US 11,516,633 B2
(45) Date of Patent: Nov. 29, 2022

(54) V2X COMMUNICATION METHOD OF TERMINAL IN WIRELESS COMMUNICATION SYSTEM AND APPARATUS USING SAME METHOD

(71) Applicant: LG ELECTRONICS INC., Seoul (KR)

(72) Inventors: Jongyoul Lee, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/967,680

(22) PCT Filed: Feb. 22, 2019

(86) PCT No.: PCT/KR2019/002249
§ 371 (c)(1),
(2) Date: Aug. 5, 2020

(87) PCT Pub. No.: WO2019/164353
PCT Pub. Date: Aug. 29, 2019

(65) Prior Publication Data
US 2021/0037359 A1    Feb. 4, 2021

Related U.S. Application Data

(60) Provisional application No. 62/634,207, filed on Feb. 23, 2018.

(30) Foreign Application Priority Data

May 23, 2018    (KR) .................. 10-2018-0058416

(51) Int. Cl.
*H04W 4/40*    (2018.01)
*H04W 72/02*    (2009.01)
(Continued)

(52) U.S. Cl.
CPC ............. *H04W 4/40* (2018.02); *H04W 72/02* (2013.01); *H04W 72/1284* (2013.01); *H04W 72/14* (2013.01)

(58) Field of Classification Search
CPC . H04W 72/1284; H04W 72/02; H04W 72/14; H04W 4/40
See application file for complete search history.

(56) References Cited

U.S. PATENT DOCUMENTS

| 2018/0020387 A1* | 1/2018 | Van Der Velde ... H04W 72/085 |
| 2019/0021111 A1* | 1/2019 | Tang ..................... H04W 72/02 |

(Continued)

FOREIGN PATENT DOCUMENTS

| EP | 3101978 | 12/2016 |
| EP | 3136811 | 3/2017 |
| WO | 2017/150958 | 9/2017 |

OTHER PUBLICATIONS

PCT International Application No. PCT/KR2019/002249, International Search Report dated Jun. 11, 2019, 2 pages.
(Continued)

*Primary Examiner* — Rhonda L Murphy
(74) *Attorney, Agent, or Firm* — Lee Hong Degerman Kang Waimey

(57) ABSTRACT

A vehicle-to-everything (V2X) communication method of a terminal in a wireless communication system and an apparatus using same method are provided. The method comprises: receiving a signal for setting a first mode and a second mode from a base station; performing V2X communication with another terminal according to the first mode; and, when a specific condition is satisfied, performing V2X communication with the another terminal according to the second mode or according to the first mode and the second mode, wherein the first mode is a mode for performing V2X communication using resources scheduled by the base sta- (Continued)

tion, and the second mode is a mode for performing V2X communication using resources determined by autonomous scheduling of the terminal.

12 Claims, 29 Drawing Sheets

(51) Int. Cl.
  *H04W 72/12* (2009.01)
  *H04W 72/14* (2009.01)

(56) References Cited

U.S. PATENT DOCUMENTS

| | | | |
|---|---|---|---|
| 2019/0357025 A1* | 11/2019 | Hwang | H04W 8/24 |
| 2020/0137769 A1* | 4/2020 | Sun | H04L 5/0091 |
| 2020/0196279 A1* | 6/2020 | Thomas | H04W 4/40 |
| 2021/0258108 A1* | 8/2021 | Basu | H04L 1/189 |

OTHER PUBLICATIONS

Nokia et al., "Discussion on latency reduction for eV2X," 3GPP TSG RAN WG1 Meeting #92, R1-1802586, Athens, Greece, Feb. 26-Mar. 2, 2018, 6 pages.

ZTE, "Discussion on the use of exceptional pool," 3GPP TSG-RAN WG2 Meeting #97, R2-1700790, Athens, Greece, Feb. 13-17, 2018, 6 pages.

Ericsson, "Resource pool sharing between mode 3 and mode 4 UEs," 3GPP TSG-RAN WG1 Meeting #92, R1-1802522, Athens, Greece, Feb. 26-Mar. 2, 2018, 5 pages.

OPPO, "Latency reduction in eV2X," 3GPP TSG-RAN2 WG1 Meeting #101, R2-1801851, Athens, Greece, Feb. 26-Mar. 2, 2018, 6 pages.

European Patent Office Application Serial No. 19756871.0, Search Report dated Oct. 26, 2020,19 pages.

Huawei, Hisilicon, "Overview of resource allocation mechanism for V2V," 3GPP TSG RAN WG1 Meeting #82b, R1-155662, Oct. 2015, 3 pages.

Fraunhofer HHI, Fraunhofer IIS, "Resource Pool Sharing between V2X Mode 3 and Mode 4 UEs," 3GPP TSG RAN WG1 Meeting #92, R1-1802888, Mar. 2018, 4 pages.

Huawei, Hisilicon, "Support of QoS for PC5-based V2X transport," 3GPP TSG-RAN WG2 Meeting #95, R2-164917, Aug. 2016, 6 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overal description; Stage 2 (Release 15)," 3GPP TS 36.300 V15.0.0, Dec. 2017, 338 pages.

3rd Generation Partnership Project (3GPP), "Technical Specification Group Radio Access Network; Evolved Universal Terrestrial Radio Access (E-UTRA); Radio Resource Control (RRC); Protocol specification (Release 15)," 3GPP TS 36.331 V15.0.1, Jan. 2018, 776 pages.

* cited by examiner

V2X COMMUNICATION METHOD OF TERMINAL IN WIRELESS COMMUNICATION SYSTEM AND APPARATUS USING SAME METHOD

CROSS-REFERENCE TO RELATED APPLICATIONS

This application is the National Stage filing under 35 U.S.C. 371 of International Application No. PCT/KR2019/002249, filed on Feb. 22, 2019, which claims the benefit of U.S. Provisional Application No. 62/634,207, filed on Feb. 23, 2018, and also claims the benefit of earlier filing date and right of priority to Korean Application No. 10-2018-0058416, filed on May 23, 2018, the contents of which are all hereby incorporated by reference herein in their entirety.

BACKGROUND OF THE DISCLOSURE

Field of the Disclosure

The disclosure relates to wireless communication and, more particularly, to a vehicle-to-everything (V2X) communication method of a UE in a wireless communication system and a device using the method.

Related Art

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication.

A new communication system design is under consideration, which takes into account services or terminals sensitive to reliability and latency; the next-generation radio access technology which supports enhanced mobile broadband communication, massive MTC, Ultra-Reliable and Low Latency Communication (URLLC), and so on may be referred to as a new RAT or new radio (NR).

Meanwhile, vehicle-to-everything (V2X) communication may also be supported in the NR. The V2X communication means communication between a user equipment (UE) installed in a vehicle and any UE, for example, a UE installed in another vehicle, a UE of a pedestrian, and/or a UE as infrastructure.

Communication modes for V2X communication include various modes, for example, mode 3 and mode 4. Mode 3 is a mode in which when a UE has data to transmit, the UE requests scheduling from a base station (eNB) and transmits the data according to a resource allocated by the base station. Mode 4 is a mode in which when a UE has data to transmit, the UE autonomously selects a resource without the aid of a base station through a sensing process in a set resource pool and transmits the data.

While an existing communication system is targeted at services that satisfy a latency requirement of about 20 ms to 100 ms, there may be services that need to meet a shorter latency requirement in a future communication system (e.g., an advanced V2X use case (rel-15)).

In particular, a UE operating in mode 3 is subject to a process of transmitting a scheduling request (SR) and a buffer state report (BSR) to receive a scheduled resource from a base station and receiving a scheduling grant (i.e., resource allocation information) from the base station, thereby enabling data transmission. When a delay in the process is greater than a delay requirement for a service in the future communication system for various reasons, the UE cannot properly receive the service. Therefore, a method and a device for solving this problem are required.

SUMMARY OF THE DISCLOSURE

An aspect of the disclosure is to provide a vehicle-to-everything (V2X) communication method of a UE in a wireless communication system and a device using the method.

In one aspect, provided is a vehicle-to-everything (V2X) communication method of a user equipment (UE) in a wireless communication system. The method includes receiving a signal for configuring a first mode and a second mode from a base station, performing V2X communication with a different UE according to the first mode and performing V2X communication with the different UE according to the second mode or according to the first mode and the second mode when a specific condition is satisfied. The first mode is a mode of performing V2X communication using a resource scheduled by the base station, and the second mode is a mode of performing V2X communication using a resource determined by autonomous scheduling by the UE.

The specific condition may be such that a time according to a latency requirement of data to be transmitted by the UE to the different UE is less than a delay time occurring due to scheduling according to the first mode.

The specific condition may be such that a delay time for the UE to receive an uplink grant from the base station so that the UE transmits data to the different UE using a resource according to different semi-persistent scheduling (SPS) is greater than a latency requirement of data to be transmitted by the UE to the different UE.

The second mode may be a mode of performing one-shot V2X communication using a resource autonomously selected by the UE from an exceptional resource.

The exceptional resource may be a resource configured to be used when the UE undergoes a radio link failure (RLF) or a hand over (HO).

The exceptional resource may be configured through system information.

When the specific condition is satisfied, the UE may transmit a mode change request to the base station, and starts the V2X communication with the different UE according to the second mode or according to the first mode and the second mode before receiving a response to the request from the base station.

When the specific condition is satisfied, the UE may perform the V2X communication according to a mode selected from among the first mode and the second mode in a shared resource pool, and the shared resource pool is a first resource pool configured for the first mode, a second resource pool configured for the second mode, or a separately configured resource pool.

In another aspect, provided is a user equipment (UE). The UE includes a transceiver configured to transmit and receive a radio signal and a processor configured to be connected with the transceiver to operate. The processor receives a signal for configuring a first mode and a second mode from a base station, performs V2X communication with a different UE according to the first mode, and performs V2X communication with the different UE according to the second mode or according to the first mode and the second mode when a specific condition is satisfied. The first mode is a mode of performing V2X communication using a resource scheduled by the base station, and the second mode is a mode of performing V2X communication using a resource determined by autonomous scheduling by the UE.

Conventionally, one of a first mode based on scheduling by a base station and a second mode based on UE-autonomous scheduling is set for a UE to perform V2X communication, and the UE operates according to the set mode. However, in the disclosure, a base station may set all the two modes for a UE, and the UE may operate in the second mode (or operate in the first and second modes at the same time) when a specific condition is satisfied while operating in the first mode. The specific condition includes a shorter delay requirement required in a future wireless communication system, a service priority, and the like. According to the disclosure, V2X communication with high reliability is possible while satisfying a shorter delay requirement in V2X communication.

DESCRIPTION OF EXEMPLARY EMBODIMENTS

Figure 1:
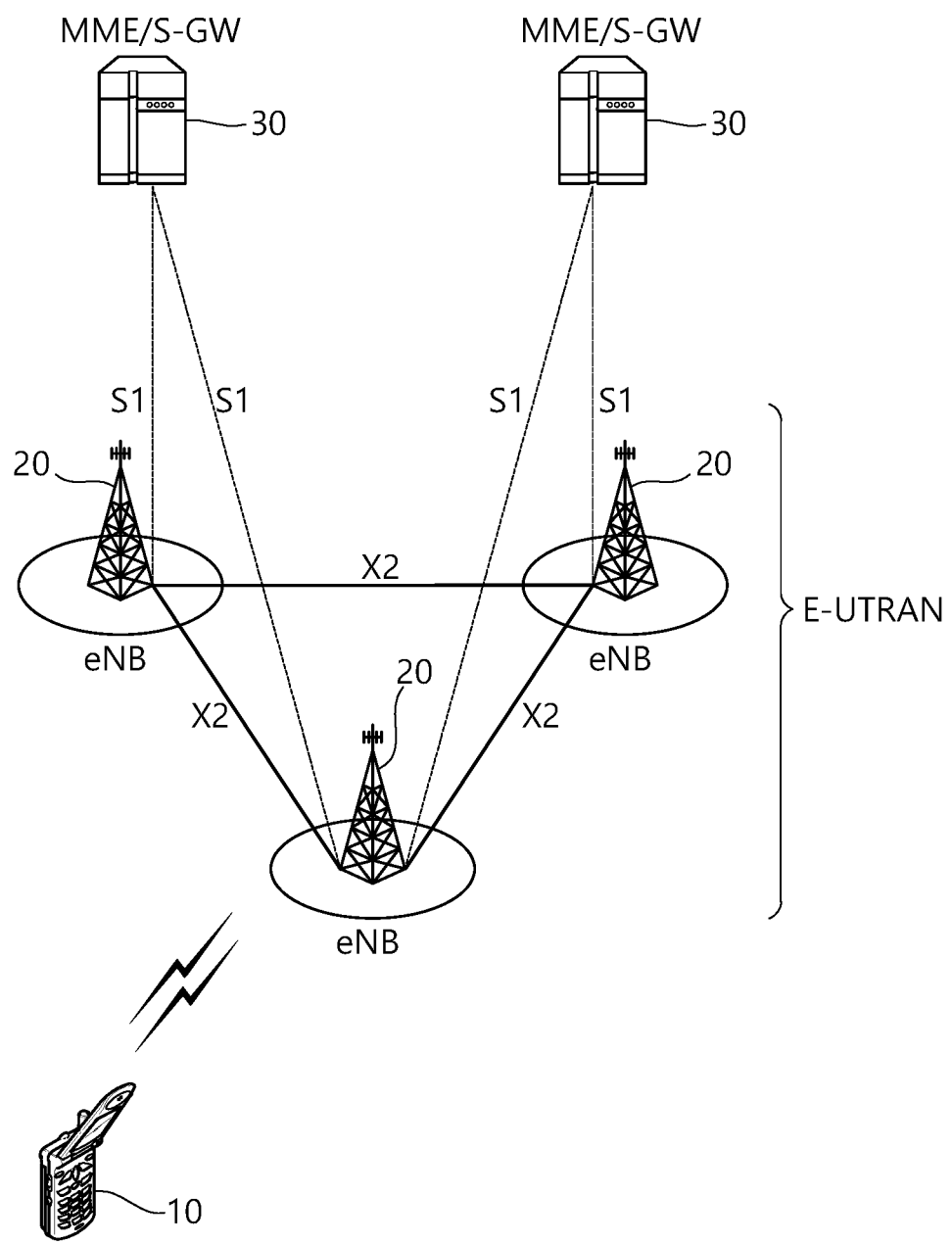
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
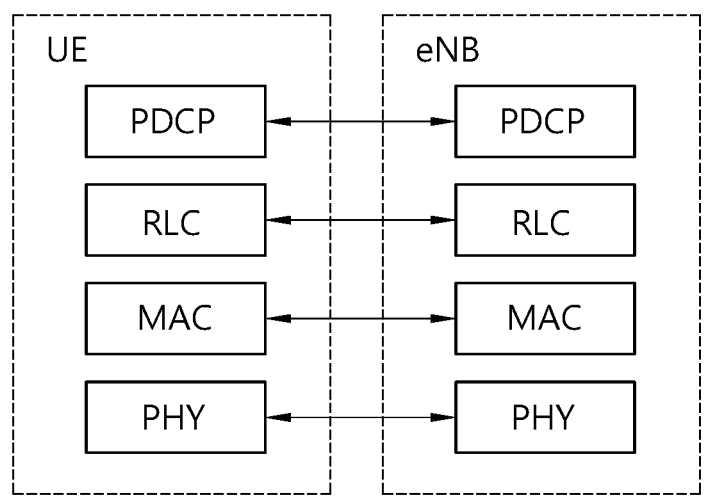
FIG. 2 is a diagram showing a wireless protocol architecture for a user plane.
Figure 3:
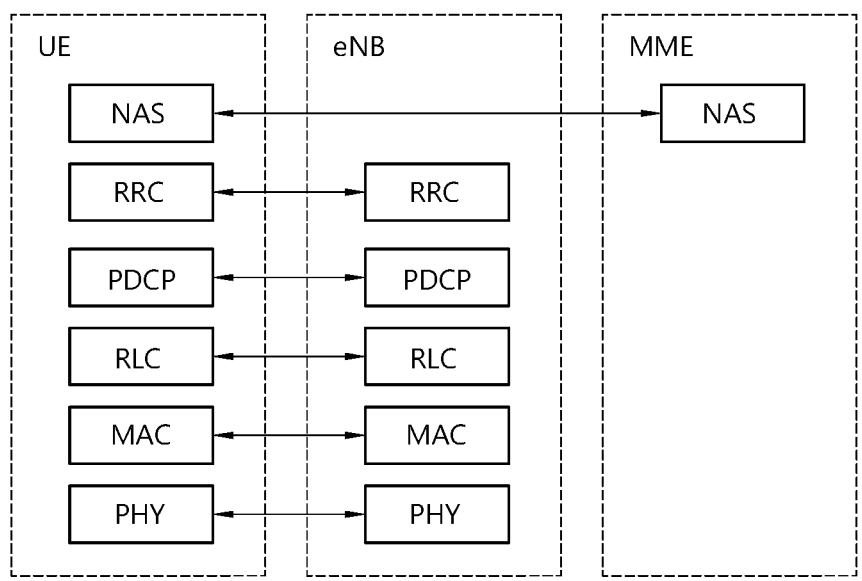
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

In what follows, a new radio access technology (RAT) will be described. The new radio access technology may also be called a new radio (NR) for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present disclosure.

Figure 4:
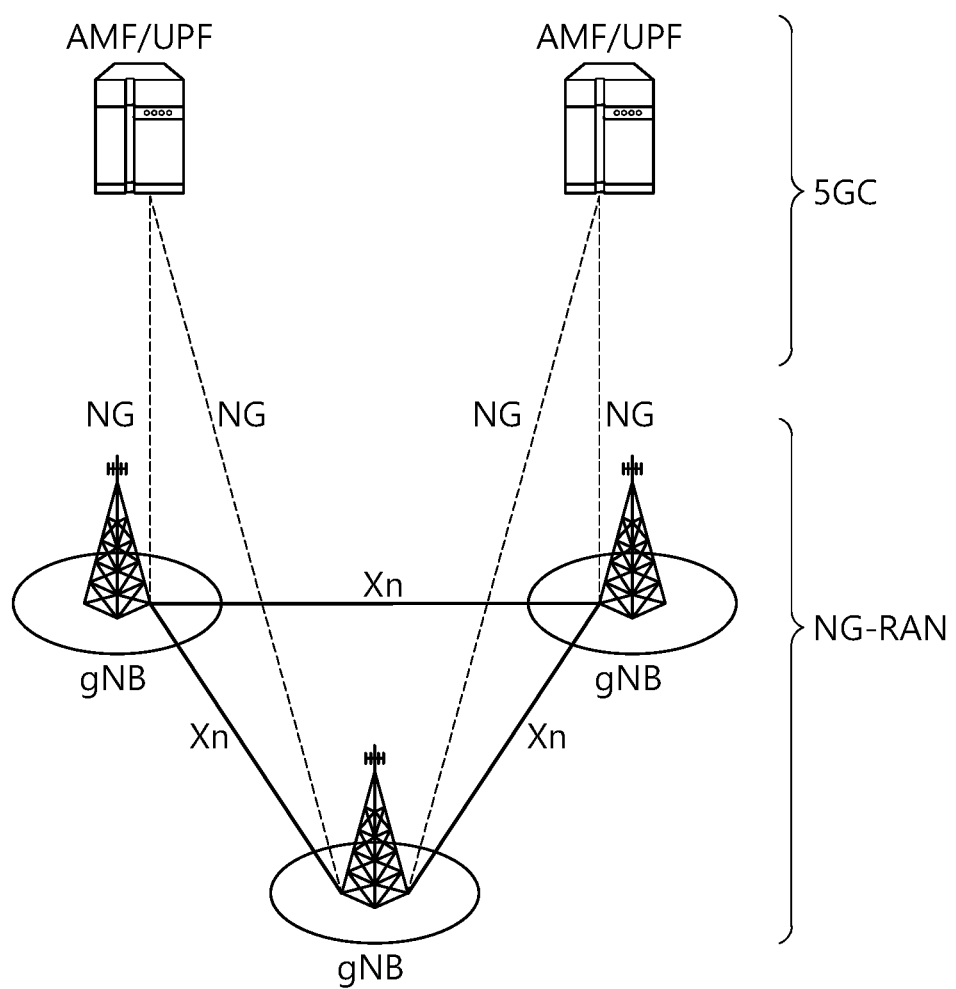
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
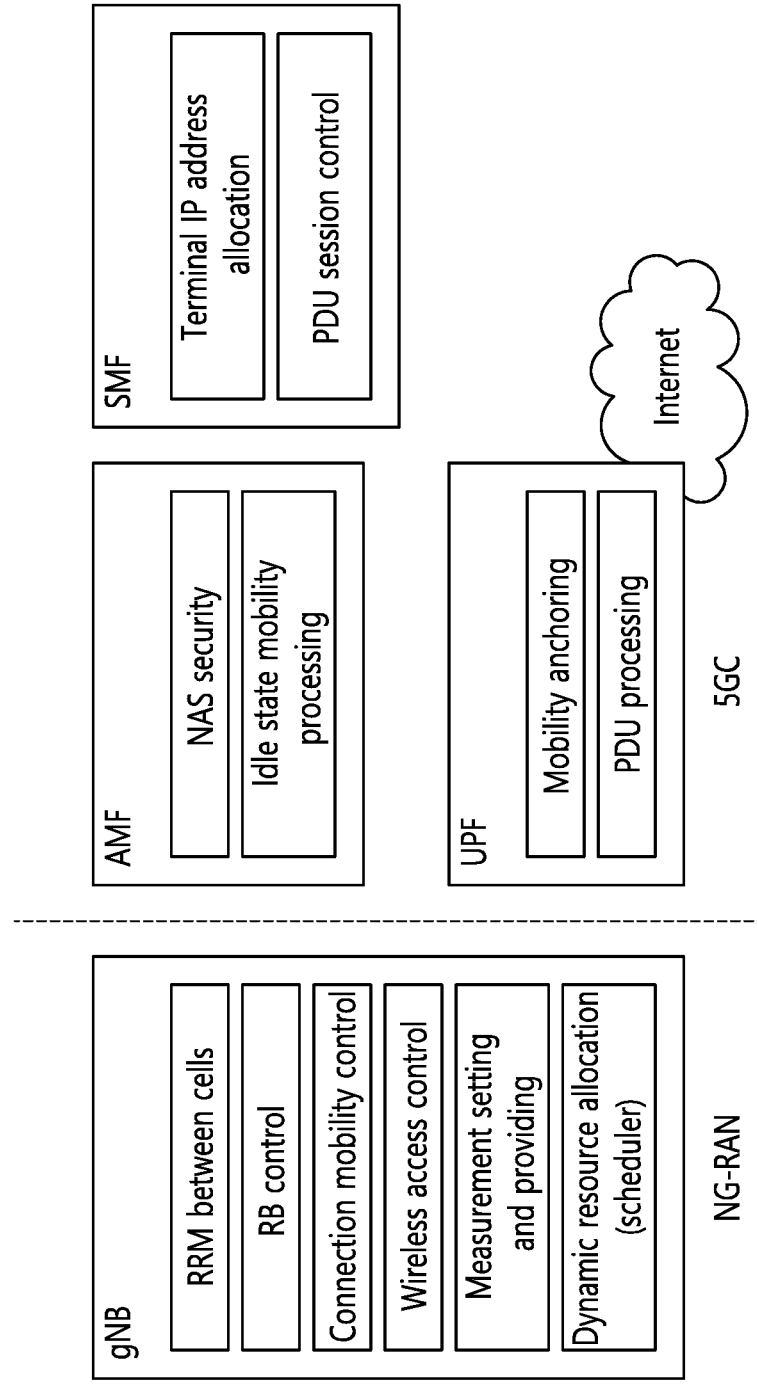
FIG. 5 illustrates a functional division between the NG-RAN and the SGC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

Figure 6:
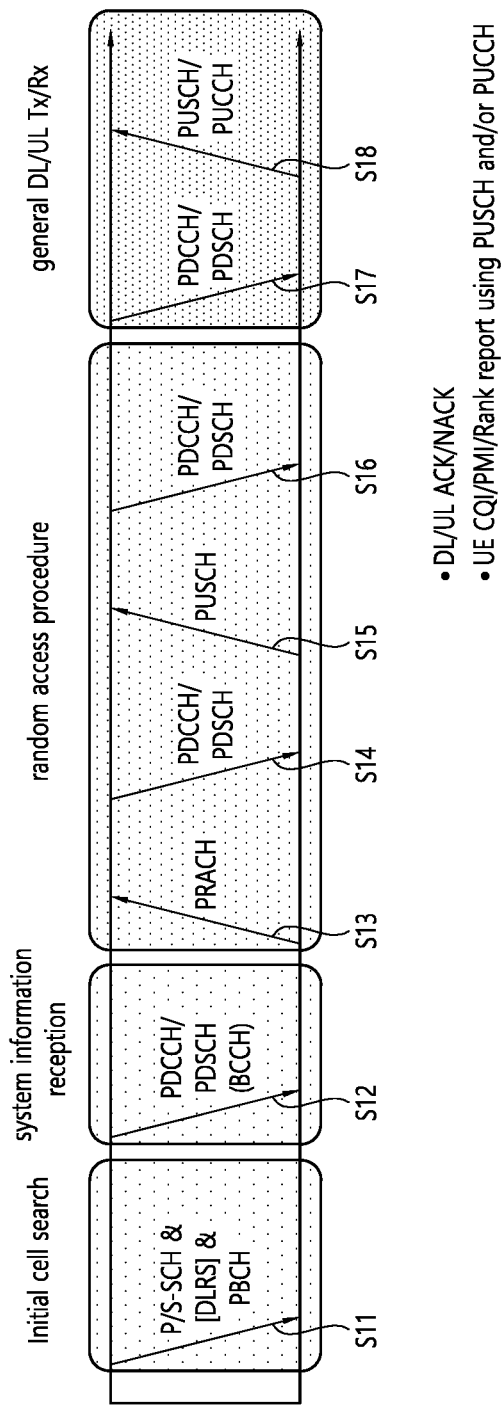
FIG. 6 illustrates a process of transmitting typical signals and physical channels used in a wireless communication system.

FIG. 6 illustrates a process of transmitting typical signals and physical channels used in a wireless communication system.

In a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS may be referred to as uplink control information (UCI). The UCI may include hybrid automatic repeat and request (HARQ) acknowledgement (ACK)/negative-ACK (HACK), scheduling request (SR), channel state information (CSI), or the like. The CSI may include a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

Meanwhile, a new RAT system such as NR may use an OFDM transmission scheme or a transmission scheme similar thereto. The new RAT system may follow OFDM parameters different from OFDM parameters of LTE. Alternatively, the new RAT system directly follows a legacy LTE/LTE-A numerology, but may have a wider system bandwidth (e.g., 100 MHz). Alternatively, one cell may support a plurality of numerologies. That is, UEs operating with different numerologies may co-exist within one cell.

Figure 7:
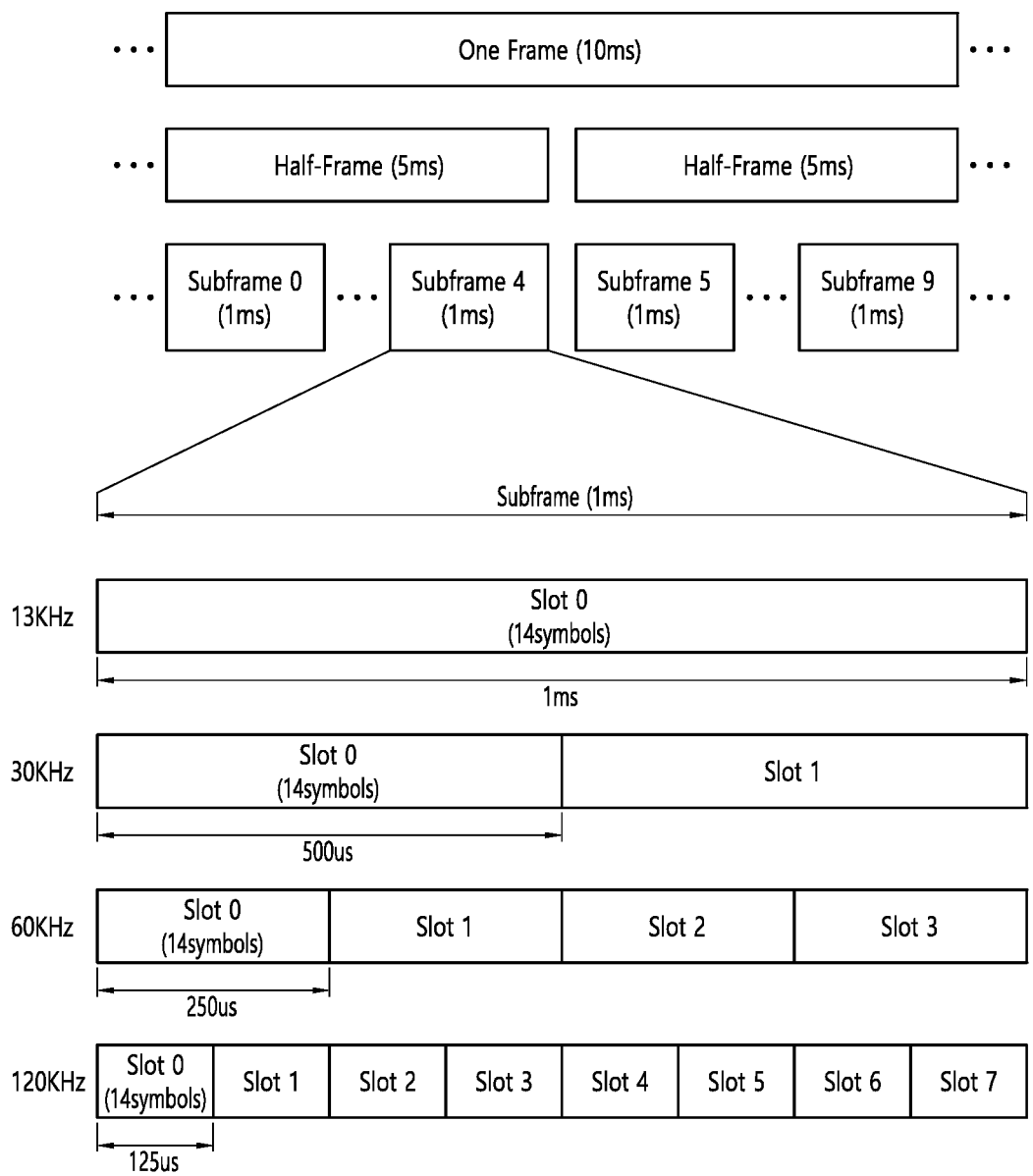
FIG. 7 illustrates a radio frame structure used in NR.

FIG. 7 illustrates a radio frame structure used in NR.

In the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$), and a number of slots per subframe ($N^{subframe,\mu}_{slot}$) in accordance with an SCS configuration ($\mu$), in a case where a normal CP is used.

TABLE 1

| SCS ($15*2^\mu$) | $N^{slot}_{symb}$ | $N^{frame, \mu}_{slot}$ | $N^{subframe, \mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
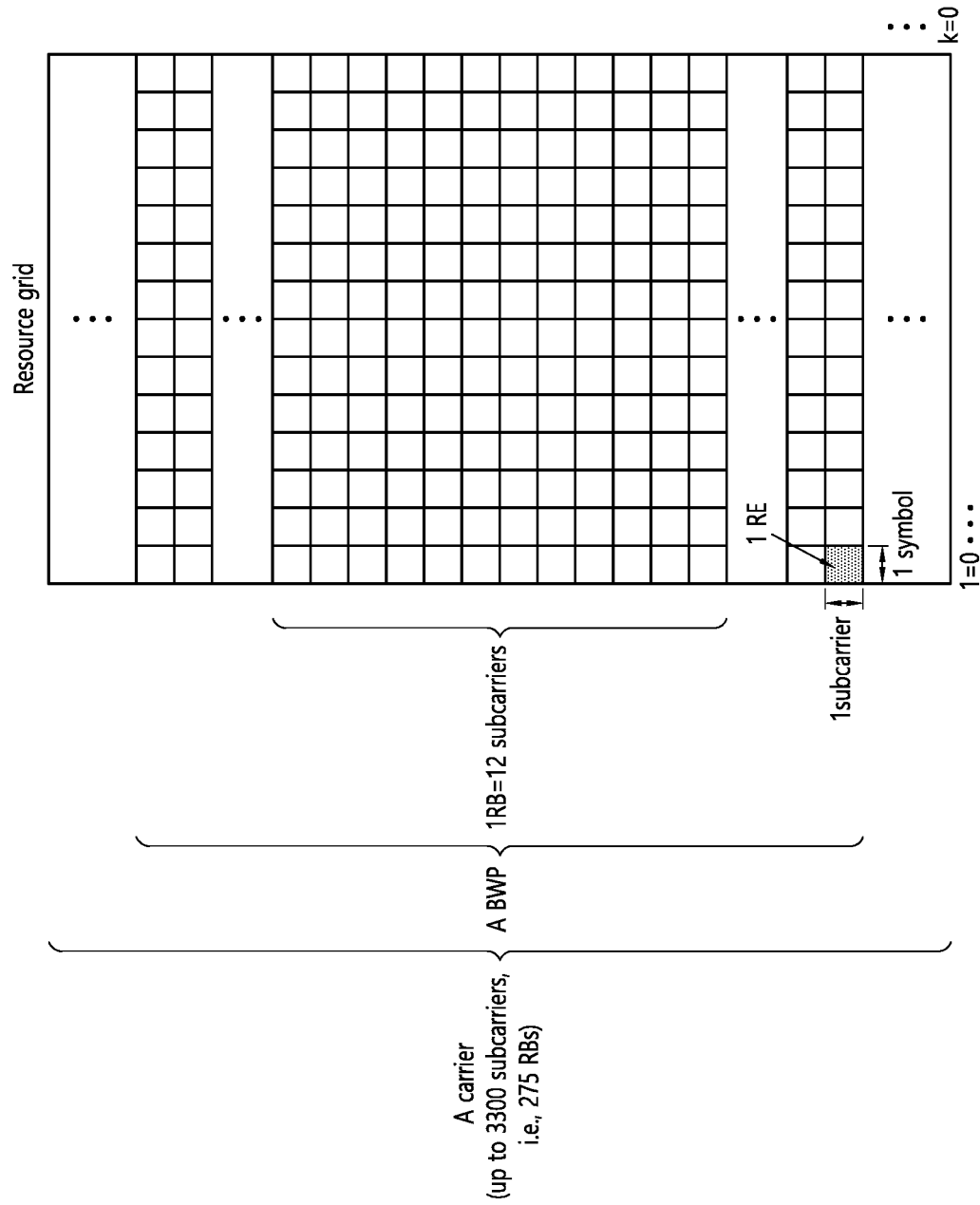
FIG. 8 illustrates a slot structure of an NR frame.

FIG. 8 illustrates a slot structure of an NR frame.

A slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Figure 9:
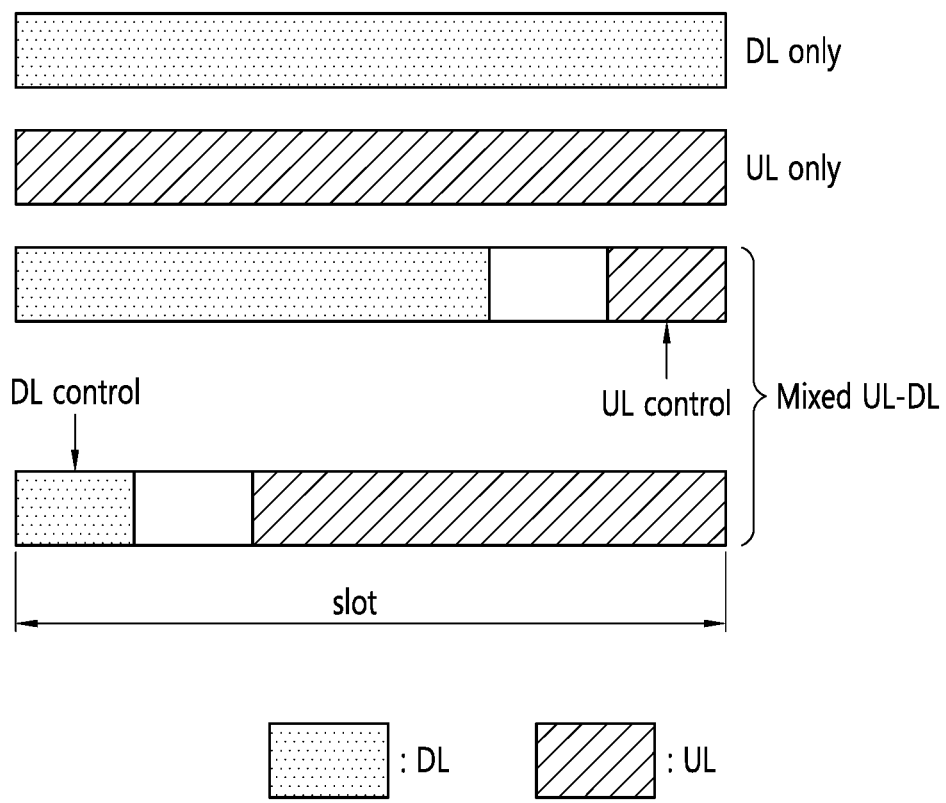
FIG. 9 illustrates a structure of a self-contained slot.

FIG. 9 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission.

For example, one slot may have any one of the following configurations. Respective durations are listed in a temporal order.

1. DL only configuration
2. UL only configuration
3. Mixed UL-DL configuration
DL region+Guard period (GP)+UL control region
DL control region+GP+UL region Herein, the DL region may be: (i) DL data region or (ii) DL control region+DL data region, and the UL region may be: (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

Meanwhile, the present disclosure may also be applied to V2X communication. The present disclosure is described with respect to the V2X communication of the NR but may also be applied to other scenarios including V2V or device-to-device (D2D) communication.

Figure 10:
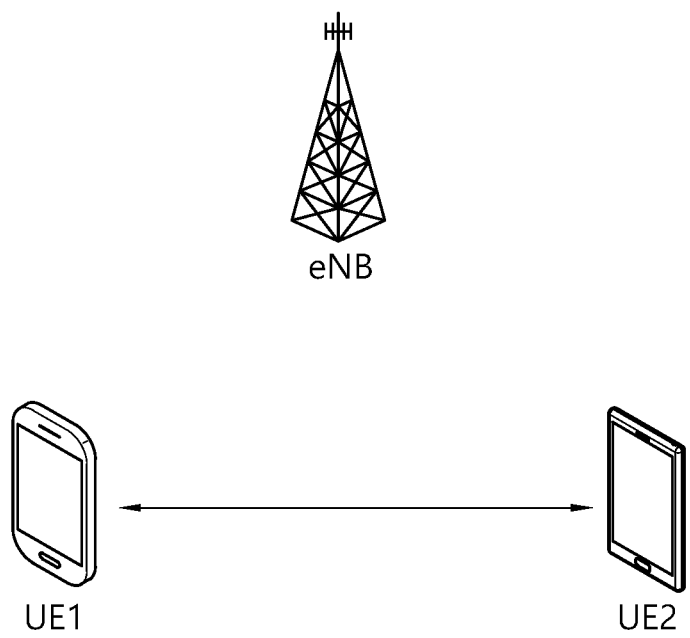
FIG. 10 illustrates UEs performing V2X or D2D communication.

FIG. 10 illustrates UEs performing V2X or D2D communication.

Referring to FIG. 10, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 11:
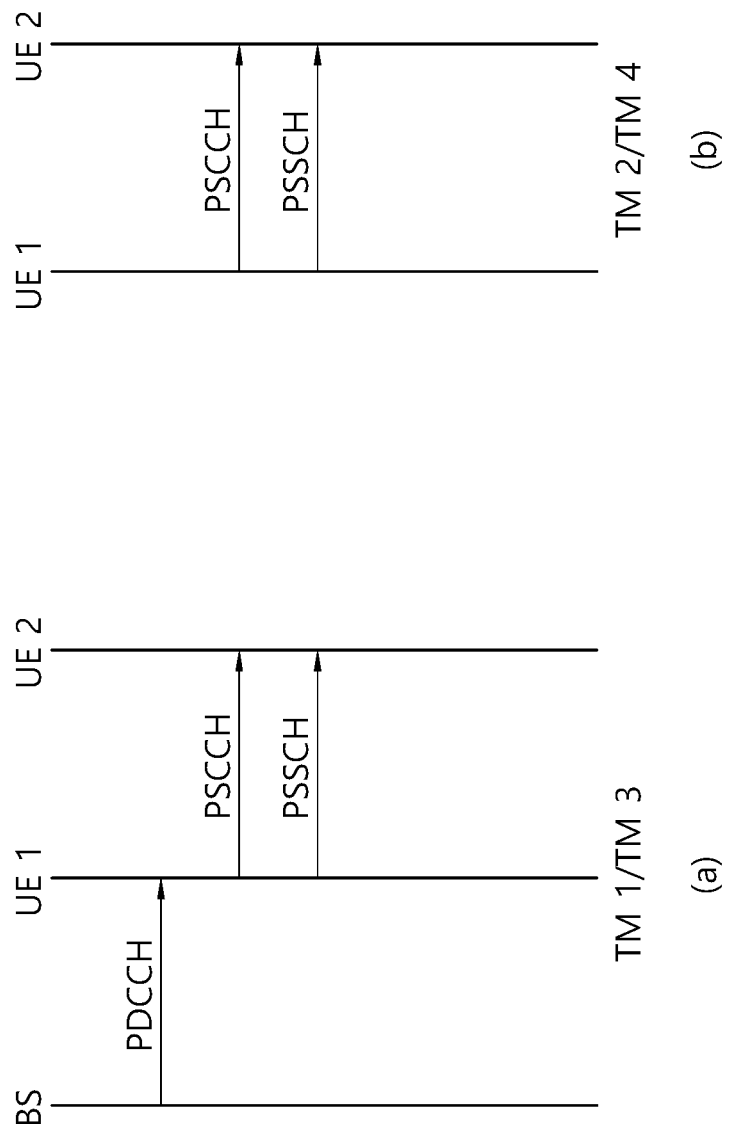
FIG. 11 illustrates a UE operation according to the transmission mode (TM) related to V2X/D2D communication.

FIG. 11 illustrates a UE operation according to the transmission mode (TM) related to V2X/D2D communication.

FIG. 11(a) is related to transmission mode 1, 3 while FIG. 11(b) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

There may be various types of V2X transmission resource pools.

Figure 12:
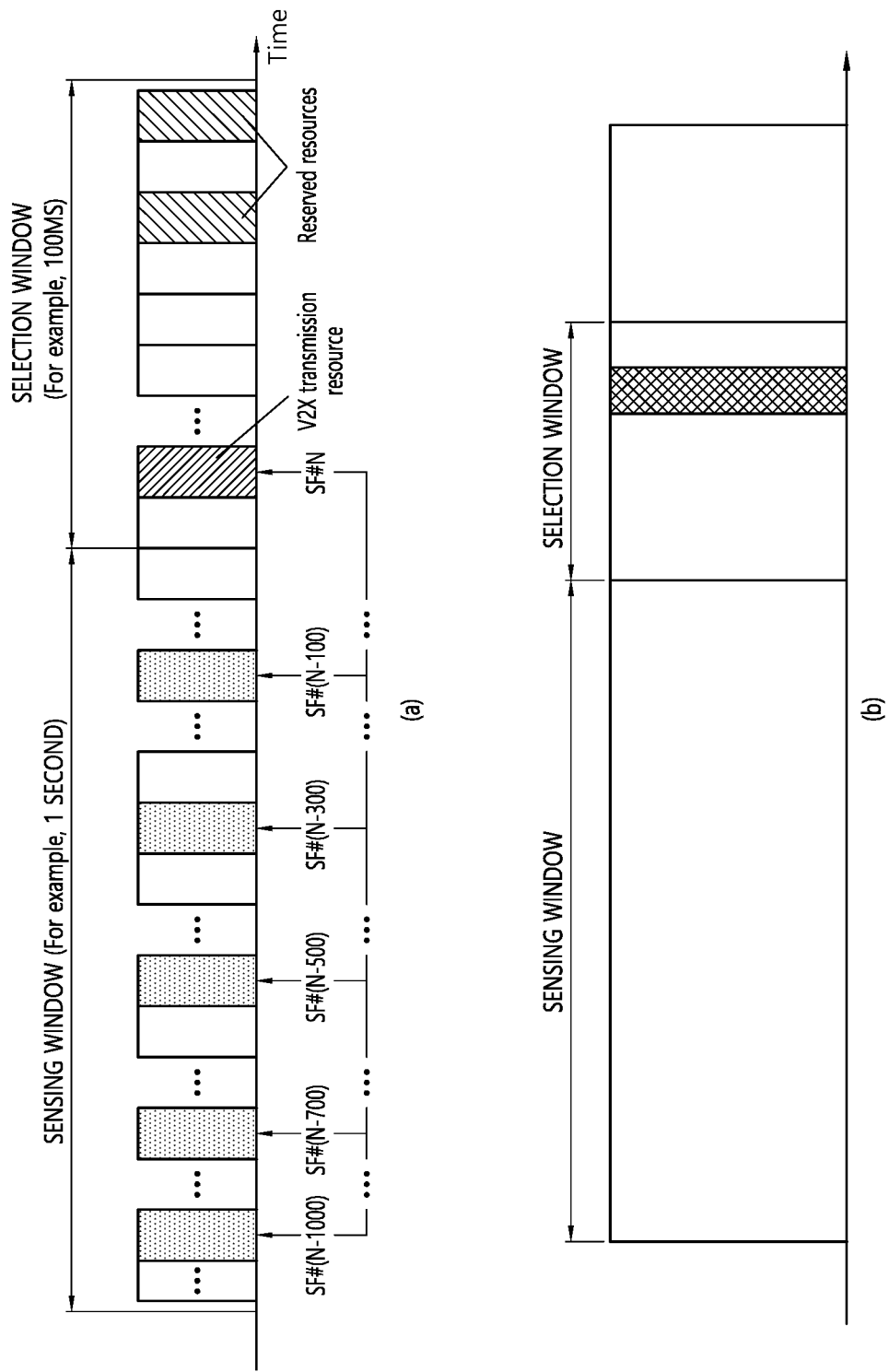
FIG. 12 illustrates types of V2X transmission resource pools, and a method of selecting V2X transmission resource according to sensing operation.

FIG. 12 illustrates types of V2X transmission resource pools, and sensing and a resource selection in resource selection mode 4.

Referring to (a) of FIG. 12, a V2X transmission resource pool may be a resource pool in which only (partial) sensing is allowed. In the V2X transmission resource pool, a UE needs to select a V2X transmission resource after performing (partial) sensing, and random selection may not be allowed. A V2X transmission resources selected by (partial)

sensing may be semi-statically retained according to a period as shown in (a) of FIG. 12.

A base station may configure the UE to perform scheduling allocation decoding or energy measurement-based sensing in order to perform V2X message transmission on the V2X transmission resource pool.

Referring to (b) of FIG. 12, a V2X transmission resource pool may be a resource pool in which only random selection is allowed. In the V2X transmission resource pool, the UE may randomly select a V2X transmission resource in a selection window without performing sensing.

Although not shown in FIG. 12, there may be a resource pool in which both sensing and random selection are allowed. The base station may indicate that a V2X resource can be selected from this resource pool by one of sensing and random selection.

Selection of a resource for V2X signal transmission may be triggered for the UE. For example, it is assumed that transmission resource selection is triggered in subframe #m. In this case, the UE may select a resource for V2X signal transmission in a subframe period from subframe #m+T1 to subframe #m+T2. The subframe period from subframe #m+T1 to subframe #m+T2 may be referred to as a selection window hereinafter. The selection window may include, for example, 100 consecutive subframes.

The UE may select at least Y subframes as candidate resources in the selection window. That is, the UE may need to consider at least Y subframes as candidate resources in the selection window. Y may be a preset value or a value set by a network. However, a method for selecting Y subframes in the selection window may depend on the configuration of the UE. That is, when Y is, for example, 50, the UE can select a method for selecting 50 subframes from among the 100 subframes included in the selection window. For example, the UE may select 50 subframes having an odd subframe number from among the 100 subframes or may select 50 subframes having an even subframe number. Alternatively, the UE may select 50 subframes according to an arbitrary rule.

In order to select (/reserve) a specific subframe, for example, subframe #N (SF#N), as a V2X transmission subframe for transmitting a V2X signal among the Y subframes, the UE may need to sense at least one subframe linked or associated with subframe #N. A (entire) subframe period defined for sensing is referred to as a sensing window and may include, for example, 1000 subframes. That is, the sensing window may be 1000 milliseconds (ms) or 1 second. For example, the UE may sense subframes corresponding to subframe #N-100*k (where k may be a set of elements in a range [1, 10] and may be a value that is set in advance or set by a network) in the sensing window.

In (a) of FIG. 12, k is {1, 3, 5, 7, 10}. That is, the UE may sense subframes #N-1000, #N-700, #N-500, #N-300, and #N-100, may estimate/determine whether subframe #N is occupied by a different V2X UE or whether subframe #N has relatively high (or a preset (/signaled) threshold level or higher of) interference, and may finally select subframe #N depending on the result.

Figure 13:
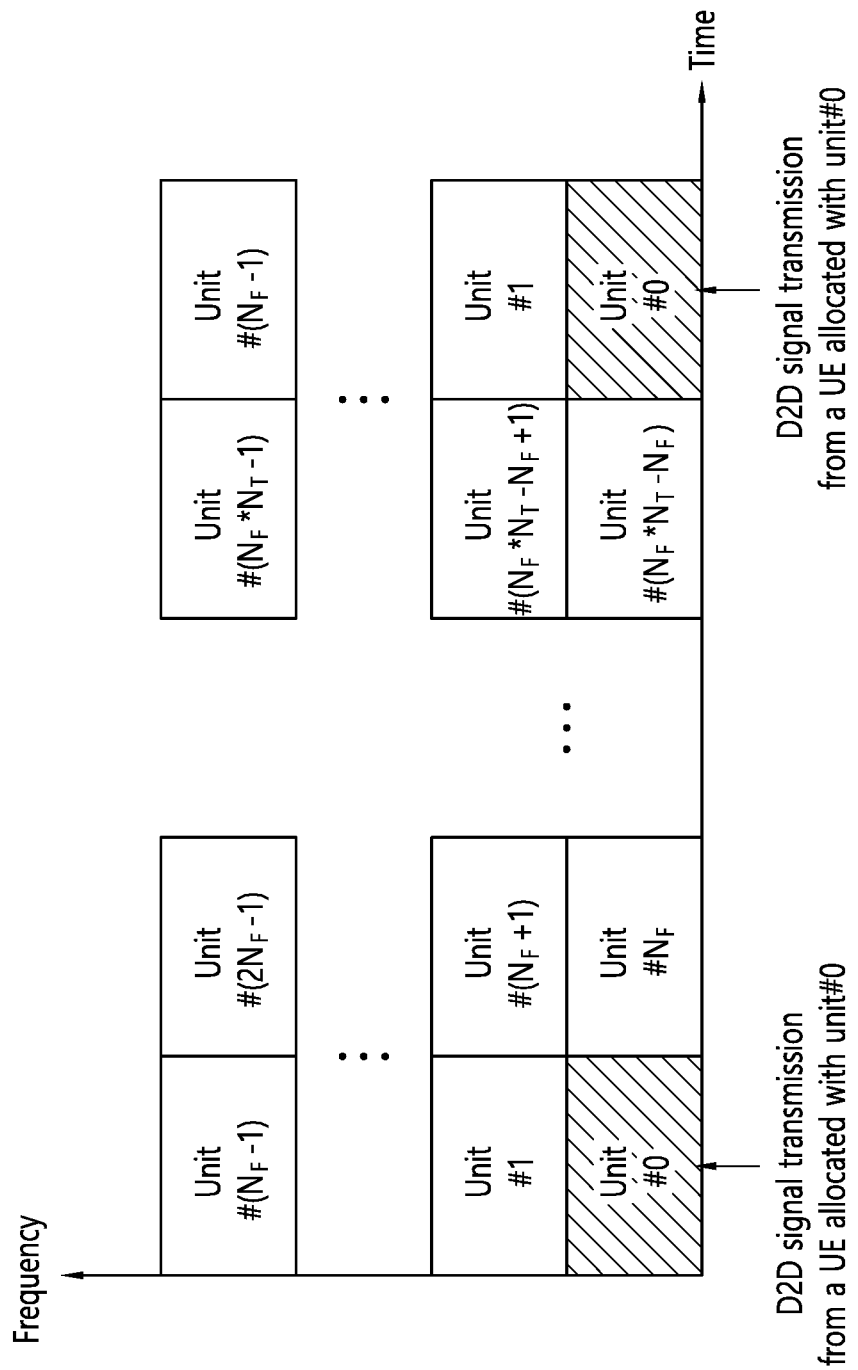
FIG. 13 illustrates an example of a configuration of resource units.

FIG. 13 illustrates an example of a configuration of resource units.

Referring to FIG. 13, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ subframes.

As shown in FIG. 13, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

Figure 14:
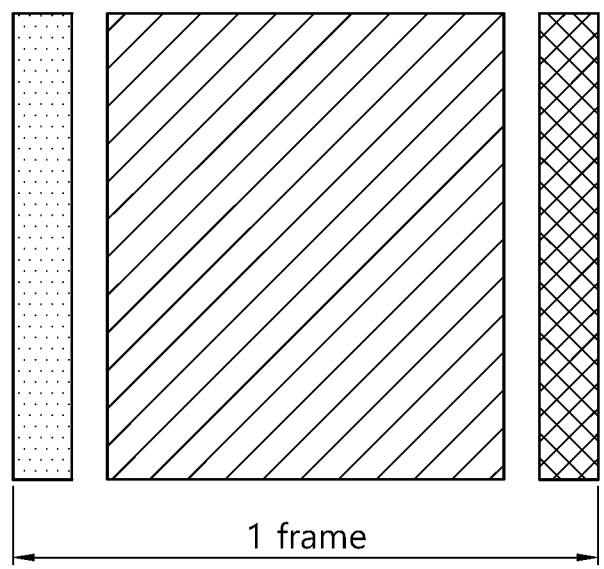
FIG. 14 illustrates an example of a frame structure available in NR.

FIG. 14 illustrates an example of a frame structure available in NR.

In NR, as shown in FIG. 14, a structure in which a control channel and a data channel are subjected to time division multiplexing (TDM) in one TTI may be considered as one frame structure in order to minimize latency.

A frame may sequentially include a downlink control region, a region for transmitting downlink data or uplink data, and an uplink control region. Downlink data scheduling information, uplink data scheduling information, and the like may be transmitted in a downlink control channel, and acknowledgment/negative acknowledgment (ACK/NACK) of downlink data, channel state information (CSI), and the like may be transmitted in an uplink control channel. Some of the downlink control region/downlink data/uplink data/ uplink control region may not be include in one frame. Further, the order of the downlink control region/downlink data/uplink data/uplink control region may also be changed.

According to characteristics of this structure, downlink (DL) transmission and uplink (UL) transmission are sequentially performed in one subframe, thus enabling DL data transmission and UL ACK/NACK reception within the subframe. As a result, when a data transmission error occurs, it takes less time to retransmit data, thereby minimizing latency in final data transmission.

In this self-contained subframe structure, a time gap may be required for a base station and a UE to switch from a transmission mode to a reception mode or to switch from the reception mode to the transmission mode. To this end, in the self-contained subframe structure, some OFDM symbols at a time of switching from a DL to a UL may be configured for a guard period (GP).

Figure 15:
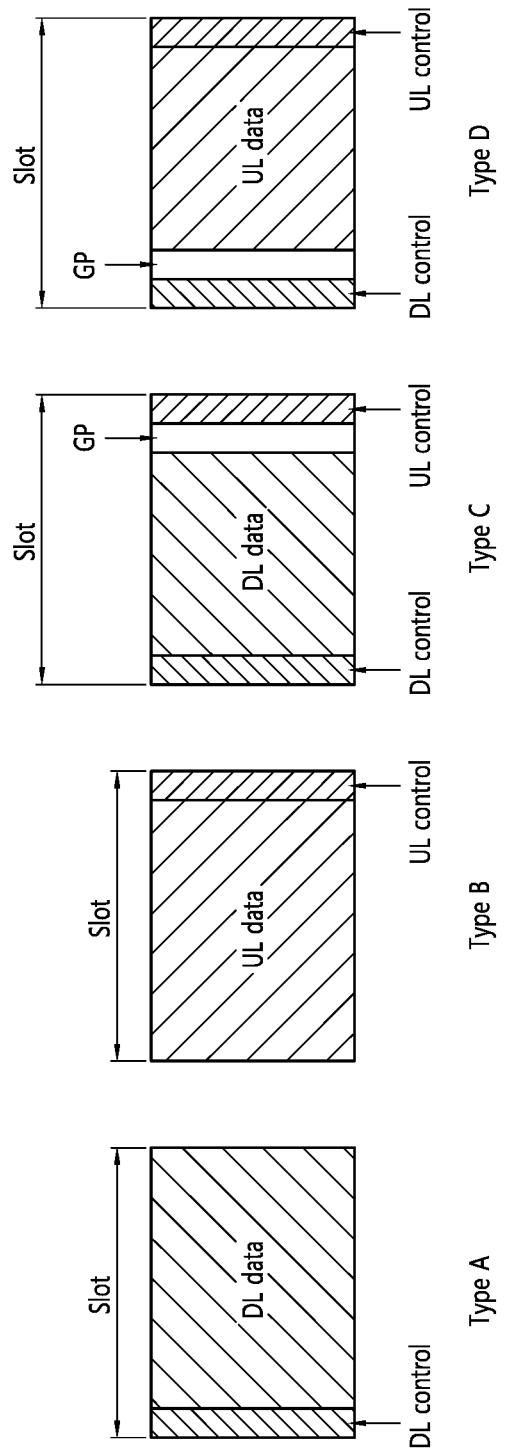
FIG. 15 illustrates examples of a frame structure in NR.

FIG. 15 illustrates examples of a frame structure in NR.

Referring to FIG. 15, a type-A frame includes a downlink control region and a downlink data region. A type-B frame includes an uplink data region and an uplink control region.

Here, the uplink control region may be dynamically omitted. A type-C frame includes a downlink control region, a downlink data region, a guard period (GP), and an uplink control region. A type-D frame includes a downlink control region, a GP, an uplink data region, and an uplink control region. Here, the positions of the uplink data region and the uplink control region may be changed from each other, and the uplink control region may be dynamically omitted.

Hereinafter, the disclosure will be described. For convenience, the disclosure is described with reference to LTE/ LTE-A for illustration but is not limited thereto. That is, the disclosure may also be applied to NR (e.g., a future wireless communication system including the features described with reference to FIG. 4 to FIG. 9).

When a UE performing V2X communication (referred to as a V2X UE) is operating in mode 3, the UE may perform additional resource selection different from an existing mode-3 operation in order to satisfy a shorter latency requirement.

As described above, there are mode 3 and mode 4 in LTE-based V2X communication. Mode 3 may be a mode in which when a UE has data (e.g., a packet) to transmit, the UE requests scheduling (e.g., resource allocation) from a base station (eNB) and transmits the data according to a resource allocated by the base station. Mode 4 may be a mode in which a UE autonomously selects a resource without the aid of a base station through a sensing process in a configured resource pool and transmits the data (e.g., a packet) through the selected resource. For example, the UE may perform sensing on resources that can be called a sensing window. Sensing may include a process of receiving/decoding a scheduling assignment transmitted by a different UE or energy sensing. Generally, since V2X communication is periodically performed, it is possible to predict whether future resources are occupied by a different UE through sensing in a sensing window. After performing the sensing process, the UE autonomously selects a resource from resources that can be called a selection window with reference to the result of the sensing process. The sensing window and the selection window are described with reference to FIG. 12.

Hereinafter, a UE operating in mode 3 may be abbreviated to a mode-3 UE, and a UE operating in mode 4 may be abbreviated to a mode-4 UE.

While LTE-based V2X communication is targeted at services that satisfy a latency requirement of about 20 ms to 100 ms, there may be services that need to meet a shorter latency requirement in advanced V2X communication (e.g., an advanced V2X use case (rel-15)). In this case, when a resource selection method according to an existing mode-4 operation is maintained, resources that cannot satisfy the latency requirement may be selected. A UE operating in mode 4 may solve this problem by adjusting the maximum value of a selection window.

However, a UE operating in mode 3 operates otherwise. The mode-3 UE needs to transmit a scheduling request (SR) and a buffer state report (BSR) in order to receive a scheduled resource from a base station and needs to receive a scheduling grant from the base station, thereby selecting a resource and then transmitting data/message. Currently, the minimum latency in mode-3 resource scheduling through a UU link for sidelink V2X is 17.5 ms. This value is merely a minimum delay, and when there are more delays in the UU link for various reasons, a latency requirement of 20 ms may not be satisfied. Therefore, a different method may be needed to overcome a delay occurring whenever a UE receives a schedule for data transmission from a base station.

In the disclosure, when at least one of the following conditions is satisfied, at least one of various methods illustrated below may be applied.

Condition (1): When a latency requirement of a packet to be transmitted is less than a mode-3 scheduling delay or when SPS resources configured for transmission of data (packet) having a low latency requirement are insufficient, at least one of the following methods may be applied.

When a UE is allocated an SPS resource to transmit a packet, the UE does not transmit a BSR to a base station if the size of the packet to be currently transmitted is smaller than the allocated resource, but transmits a BSR if the size of the packet is greater than the allocated resource. If a high data rate is unexpectedly required and thus a packet size is greater than a previously allocated SPS resource, the UE continues to transmit a BSR, in which case an excessive delay may occur. In view of this aspect, when condition 2 is satisfied, at least one of the following methods may be applied.

Condition (2): When the size of a packet to be currently transmitted is greater than a previously allocated SPS resource.

For example, it is assumed that a UE is allocated resources from a base station to transmit packets having different SPS periods (e.g., 100 ms, 80 ms, and 60 ms). Here, when the size of a packet to be transmitted is excessively large, an SPS period needs to be changed, or timings for SPS resources are changed during proper transmission of packets, the UE may transmit supplementary information indicating this situation to the base station. The UE transmits an SR and a BRS in order to be allocated an uplink resource for reporting the supplementary information. A method for reducing a delay that occurs in this situation may be needed. In view of this aspect, when condition 3 is satisfied, at least one of the following methods may be applied.

Condition (3): When a mode-3 UE needs to receive an uplink grant in order to report UE information (e.g., a BSR and an SR) for an uplink grant to a base station for transmission of SPS different from previously allocated SPS information, where a delay occurring in receiving the uplink grant is greater than a latency requirement of a packet to be transmitted.

That is, condition (3) may correspond to a case where the delay time for the UE to receive the uplink grant from the base station is greater than a latency requirement of data that the UE transmits to a different UE.

In addition, the following series of processes may be required for a V2X UE to initially operate as a mode-3 UE. The UE in an idle state operates in mode 4 if there is a mode-4 resource pool when decoding an SIB. Otherwise, the UE transmits V2X interest information to the base station, and the base station determines mode 3 or 4 and allocates a resource. Here, when there is an excessive delay in transmitting the V2X interest information, a latency requirement of a packet to be transmitted may not be satisfied. In view of this aspect, when condition 4 is satisfied, at least one of the following methods may be applied.

Condition (4): When a UE to operate as a mode-3 UE transmits V2X interest information to a base station with an excessive delay (e.g., a value higher than a latency requirement of a required service) in an initial process.

In addition to the foregoing conditions (1) to (4), there may be other conditions described below.

Condition (5): When the coding rate of a packet to be transmitted via an SPS reserved resource is not satisfied, where the coding rate may be a maximum coding rate required for transmission by a transmitting UE.

Condition (6): In sidelink SPS transmission and uplink transmission on different carriers, when the ProSe per packet priority (PPPP) of a sidelink is lower than a predefined threshold, power is reduced or dropped to prioritize uplink transmission.

When the foregoing conditions or a combination of the conditions is satisfied (/triggered), at least one of the following methods may be applied. When the foregoing conditions occur a predefined number of times or more, for example, when a specific condition is triggered more than a predefined value (e.g., K) times, at least one of the following methods may be applied.

An exceptional resource pool (which may also be referred to simply as an exceptional pool) for V2X communication and a normal resource pool (which may also be referred to simply as a normal pool) may be forwarded through the following signaling.

TABLE 3

SystemInformationBlockType 21
The IE SystemInformationBlockType21 contains V2X sidelink communication configuration.
SystemInformationBlockType21 information element

```
-- ASN1START
SystemInformationBlockType21-r14 ::= SEQUENCE {
    sl-V2X-ConfigCommon-r14           SL-V2X-ConfigCommon-r14           OPTIONAL,      -- Need OR
    lateNonCriticalExtension          OCTET STRING                      OPTIONAL,
    ...
)
SL-V2X-ConfigCommon-r14 ::=    SEQUENCE {
    v2x-CommRxPool-r14                SL-CommRxPoolListV2X-r14          OPTIONAL,      -- Need
OR
    v2x-CommTxPoolNormalCommon-r14    SL-CommTxPoolListV2X-r14          OPTIONAL,      -- Need
OR
    v2x-CommTxPoolExceptional-r14     SL-CommResourcePoolV2X-r14        OPTIONAL,      -- Need
OR
    v2x-SyncConfig-r14                SL-SyncConfigListV2X-r14          OPTIONAL,      -- Need
OR
    v2x-InterFreqInfoList-r14         SL-InterFreqInfoListV2X-r14       OPTIONAL,      -- Need
OR
    v2x-ResourceSelectionConfig-r14   SL-CommTxPoolSensingConfig-r14    OPTIONAL,      -- Need
OR
    zoneConfig-r14                    SL-ZoneConfig-r14                 OPTIONAL       -- Need
OR
}
```

TABLE 3-continued

SystemInformationBlockType 21
The IE SystemInformationBlockType21 contains V2X sidelink communication configuration.
SystemInformationBlockType21 information element

```
SL-CommTxPoolSensingConfig-r14 ::=      SEQUENCE {
    pssch-TxConfigList-r14                  SL-PSSCH-TxConfigList-r14,
    thresPSSCH-RSRP-List-r14                SL-ThresPSSCH-RSRP-List-r14,
    restrictResourceReservationPeriodList-r14   SL-RestrictResourceReservationPeriodList-
r14 OPTIONAL,  -- Need OR
    probResourceKeep-r14                    ENUMERATED {v0, v0dot2, v0dot4, v0dot6, v0dot8,
                                                spare3,spare2, spare1}
}
-- ASN1STOP
```

The exceptional resource pool and the normal resource pool may be transmitted through system information block (SIB) type 21 (which may be simply abbreviated to SIB 21) as shown in the above table in 'base station-(V)UE' communication.

'v2x-CommTxPoolExceptional' may indicate a resource allowed for the UE to perform V2X sidelink communication under an exceptional condition. 'v2x-CommTxPoolNormalCommon' may indicate a resource allowed for the UE to perform V2X sidelink communication when the UE is in an RRC idle state or when the UE is in an RRC connected state while performing V2X sidelink communication at a frequency other than a primary frequency.

In this signaling, the configuration of a transmission resource pool for V2X sidelink communication, such as 'v2x-CommTxPoolExceptional' and 'v2x-CommTxPoolNormalCommon', may be indicated through a bitmap.

Although an example of indicating the exceptional resource pool for V2X communication, the normal resource pool, and the like through SIB 21 has been illustrated above, the disclosure is not limited thereto. For example, in NR, a new SIB or RRC message may be defined, thereby providing information about the foregoing resource pools.

A V-UE may use the normal transmission resource pool (normal Tx pool), and may perform sidelink transmission using the exceptional resource pool when an exceptional condition is satisfied. In this case, a resource allocation scheme may be random selection from the exceptional resource pool without an existing mode-4 sensing operation.

The exceptional condition may refer to an occasion that exceptionally occurs in a link. For example, the exceptional condition may be occurrence of a radio link failure (RLF) occurs in the link for some reason, occurrence of a hand over (HO), and the like. When the exceptional condition is satisfied, the UE may perform transmission using the exceptional resource pool to prevent deterioration in performance of the link and may transmit corresponding control signaling to a receiving UE (Rx UE). Hereinafter, in the disclosure, an exceptional resource is described as a resource that can be used in an RLF/HO, which is merely for illustration, but the disclosure is not limited thereto. That is, the exceptional resource may collectively refer to a resource other than a resource scheduled by the base station.

Figure 16:
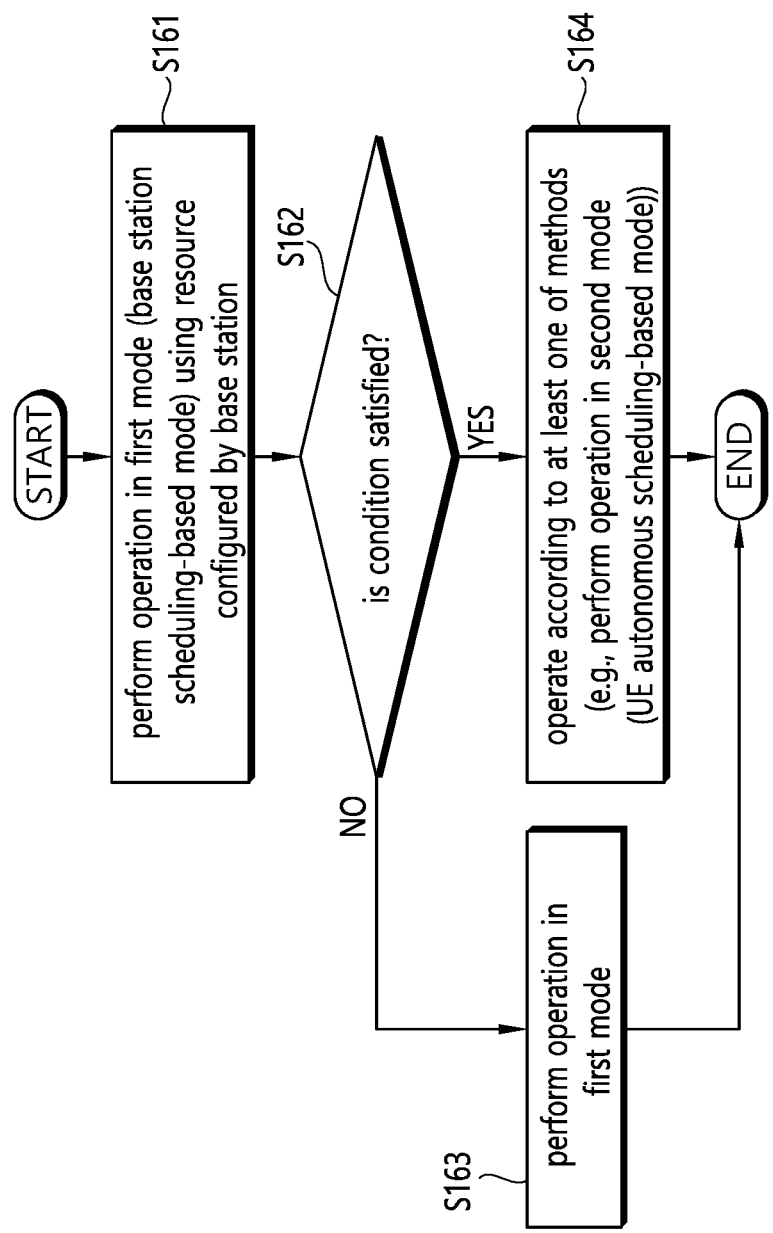
FIG. 16 illustrates a UE operation according to the disclosure.

FIG. 16 illustrates a UE operation according to the disclosure.

Referring to FIG. 16, a UE may perform an operation in a first mode (base station scheduling-based mode) using a resource configured by a base station (S161). The first mode may be a mode of performing UE-to-UE communication (V2X communication) based on scheduling by the base station (using a resource scheduled by the base station). For example, the first mode may correspond to mode 1 or mode 3 described above.

The UE determines whether a specific condition is satisfied (S162). The specific condition may be at least one of the foregoing conditions (1) to (6).

When the specific condition is not satisfied, the UE continues to perform the operation according to the first mode (S163).

When the specific condition is satisfied, the UE may operate according to at least one of the following methods (S164). For example, the UE may perform an operation according to a second mode. Here, the second mode is a V2X communication mode other than V2X communication using a resource scheduled by the base station and may refer to, for example, a UE autonomous scheduling-based mode (e.g., mode 2/4 described above) and/or a mode of performing V2X communication using an exceptional resource or a specific resource pool other than a mode-3 resource pool. Hereinafter, for convenience, it is assumed that the first mode is a mode of performing V2X communication using a resource scheduled by the base station, and the second mode is a mode of performing V2X communication using a resource determined by autonomous scheduling by the UE, but the disclosure is not limited thereto (e.g., the second mode may be a mode of performing V2X communication using an exceptional resource or a resource autonomously selected by the UE from a specific resource pool other than a mode-3 resource pool).

Hereinafter, methods that the UE can perform when the specific condition is satisfied will be described.

<Method 1>

When the foregoing conditions (at least one of conditions (1) to (6)) are satisfied, the UE operating in the first mode (e.g., mode 3) may perform one-shot (or a plurality of transmissions) using an exceptional resource pool configured through SIB 21. Here, the transmission using the exceptional resource pool may use a mode-4 resource allocation scheme (i.e., sensing-based resource selection) or may use random selection from the exceptional resource pool.

Figure 17:
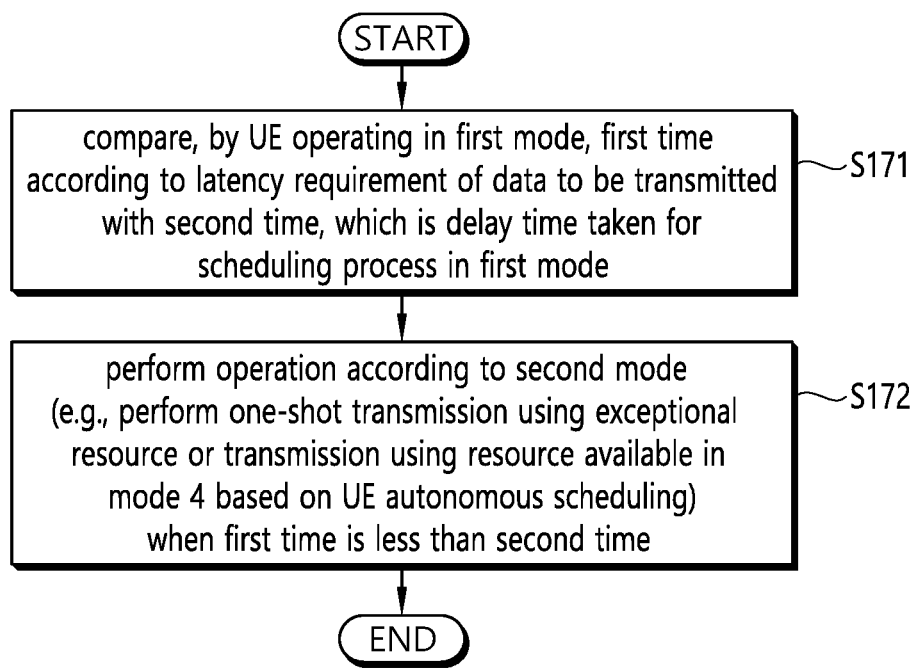
FIG. 17 illustrates an example of a UE operation according to method 1.

FIG. 17 illustrates an example of a UE operation according to method 1.

Referring to FIG. 17, a UE compares a first time according to a latency requirement of data to be transmitted with a second time, which is a delay time taken for a scheduling process in the first mode (S171). This operation may be for determining whether the foregoing condition (1) is satisfied.

As described above, the first mode may be a mode of performing UE-to-UE communication (V2X communication) based on scheduling by the base station and may correspond to, for example, mode 1 or mode 3 described above. The UE may be a UE operating in the first mode.

When the first time is less than the second time, the UE may perform an operation according to a second mode (S172). The operation according to the second mode may be, for example, one-shot transmission using an exceptional resource or transmission using a resource available in mode 4 based on UE autonomous scheduling.

For example, the UE may need to transmit data having a very short latency requirement while performing V2X communication using a resource scheduled by the base station. That is, a first time according to the latency requirement of the data may be shorter than a second time, which is a delay time taken for a scheduling process in the first mode. For example, when operating according to mode 3, the UE may need to transmit a scheduling grant (SR), a buffer state report (BSR), and the like to the base station and may receive a scheduling grant from the base station in response, thereby selecting a resource and transmitting the data. Data transmission/services having a latency requirement shorter than a delay time required for a mode-3 operation may be required. In this case, when the UE continues to operate in mode 3, the latency requirement of the data cannot be satisfied.

According to the disclosure, when specific data/service satisfies a latency requirement shorter than a scheduling time delay value required for a mode-3 operation, the UE may transmit/provide the data/service on a one-shot basis (i.e., operate according to the second mode) using an exceptional resource (resource configured in advance through system information to be originally used for a radio link failure or handover).

That is, when a specific condition is satisfied, the UE may autonomously perform an operation according to the second mode (or a network may allow in advance the UE to perform the operation according to the second mode).

<Method 2>

The UE may perform one-shot transmission (or a plurality of transmissions) using a specific resource pool other than a mode-3 resource pool. Here, the other specific resource pool may be an entire mode-4 resource pool (i.e., a normal resource pool defined in SIB 21), may be a set of resources predefined in the mode-4 resource pool, or may be a separate resource pool other than the mode-3/4 resource pools.

As a transmission method, the UE may select an existing mode-4 operation when the normal resource pool is used, may select a mode-3 operation when the separate mode-3 resource pool is used, and may select the mode-3 or mode-4 operation when the separate resource pool is configured (a transmission method depends on the configuration of the UE).

Here, when transmission using the separate resource pool is supported, the separate resource pool may be configured through an SIB or UE-specific signaling.

Figure 18:
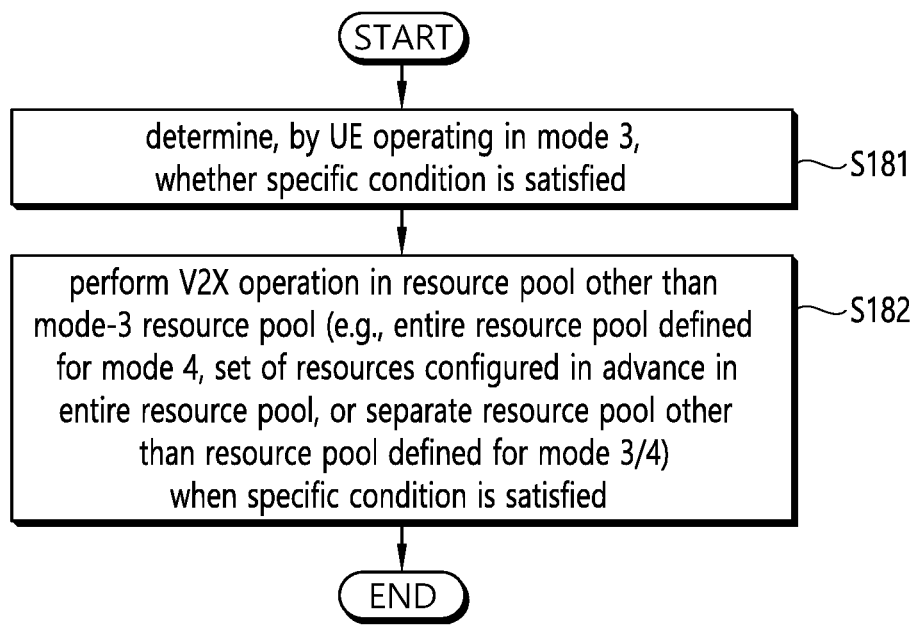
FIG. 18 illustrates an example of a UE operation according to method 2.

FIG. 18 illustrates an example of a UE operation according to method 2.

Referring to FIG. 18, a UE operating in mode 3 determines whether a specific condition is satisfied (S181). The specific condition may be, for example, at least one of the foregoing conditions (1) to (6).

When the specific condition is satisfied, the UE may perform a V2X operation using a resource pool (e.g., an entire resource pool defined for mode 4, a set of resources configured in advance in the entire resource pool, or a separate resource pool other than a resource pool defined for mode 3/4) other than a mode-3 resource pool (S182).

<Method 3>

As soon as the foregoing conditions is satisfied, the UE operating in the first mode (e.g., mode 3) may transmit a request to change the transmission mode (or a request for resource reselection) to the base station and may immediately perform an operation in the second mode (e.g., mode 4), or may operate in reverse. That is, when the condition is satisfied, the UE may immediately perform a mode-4 operation and transmit the request to the base station. Here, the mode-4 operation may be a sensing operation (or random selection) using an existing normal resource pool or an operation using an exceptional resource pool according to method 1.

Figure 19:
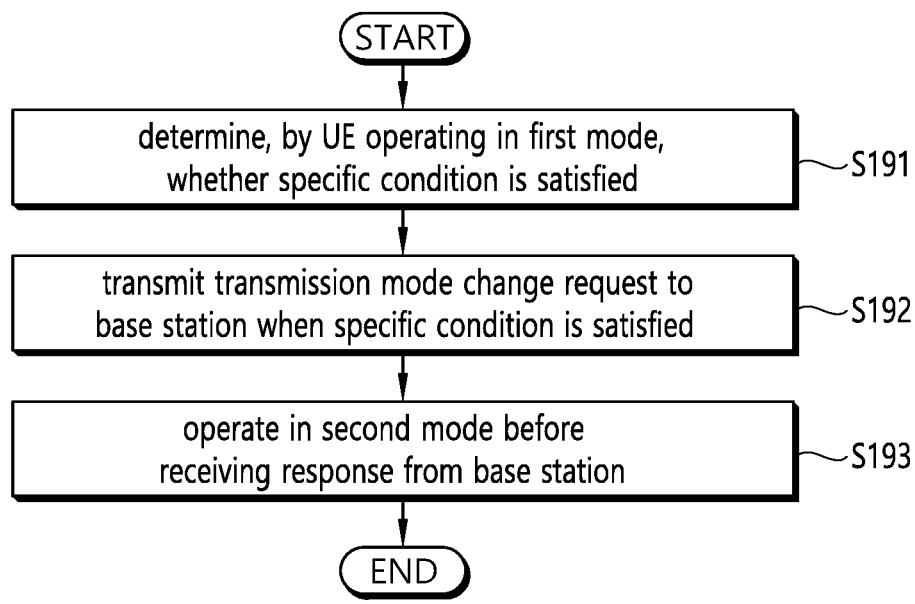
FIG. 19 illustrates an example of a UE operation according to method 3.

FIG. 19 illustrates an example of a UE operation according to method 3.

Referring to FIG. 19, a UE operating in the first mode (e.g., mode 3) determines whether a specific condition is satisfied (S191). The specific condition may be, for example, at least one of the foregoing conditions (1) to (6). When the specific condition is satisfied, the UE transmits a transmission mode change request to a base station (S192). The UE operates in the second mode before receiving a response from the base station (S193). In FIG. 19, operations S192 and 193 may be performed in reverse order.

<Method 4>

Only a mode-4 operation may be configured in advance to be performed for an exceptional service with a short latency requirement or a high priority. For example, when an idle UE selects an initial mode, the base station may configure mode 4 by default for the UE using the exceptional service. Here, the mode-4 operation may be a sensing operation (or random selection) using an existing normal resource pool or an operation using an exceptional resource pool according to method 1.

Figure 20:
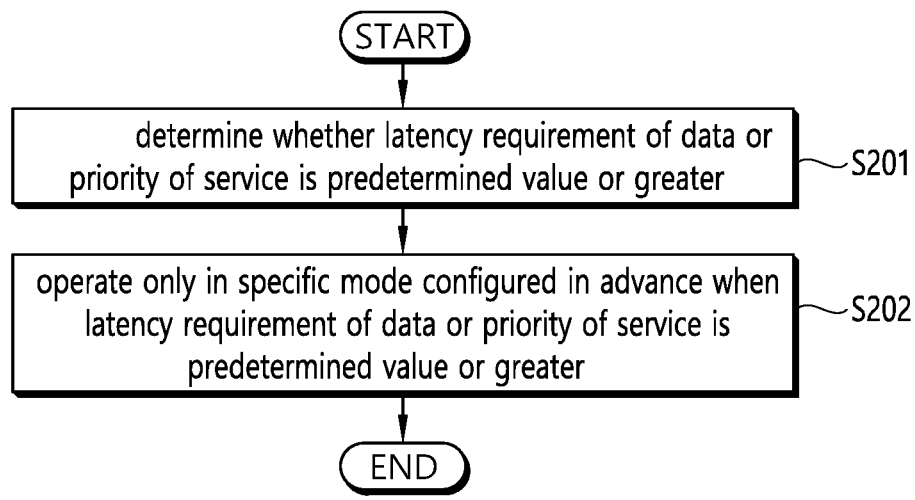
FIG. 20 illustrates an example of a UE operation according to method 4.

FIG. 20 illustrates an example of a UE operation according to method 4.

Referring to FIG. 20, a UE determines whether a latency requirement of data or the priority of a service is equal to or greater than a predetermined value (S201). That is, the UE determines whether the data to be transmitted or the service to be provided is urgent or has a high priority.

When the latency requirement of the data or the priority of the service is equal to or greater than the predetermined value, the UE operates only in a specific mode configured in advance (S202). The specific mode may be, for example, mode 4.

Here, both mode 3 and mode 4 are configured in advance for the UE. That is, when the latency requirement of the data or the priority of the service is equal to or greater than the predetermined value, the UE may be configured to operate in mode 4, and for other data/services, the UE may be configured to operate in mode 3. Alternatively, when the latency requirement of the data or the priority of the service is equal to or greater than the predetermined value, the UE may be configured to operate in mode 3 and mode 4 (i.e., operate in two modes).

The foregoing methods may be exceptionally used only when a current PPPP is higher than a predetermined threshold, or may be exceptionally applied depending on each service. Alternatively, the foregoing methods may be applied according to a service priority or may be available for a long resource reservation-based service or only in a low (or high) CBR.

Figure 21:
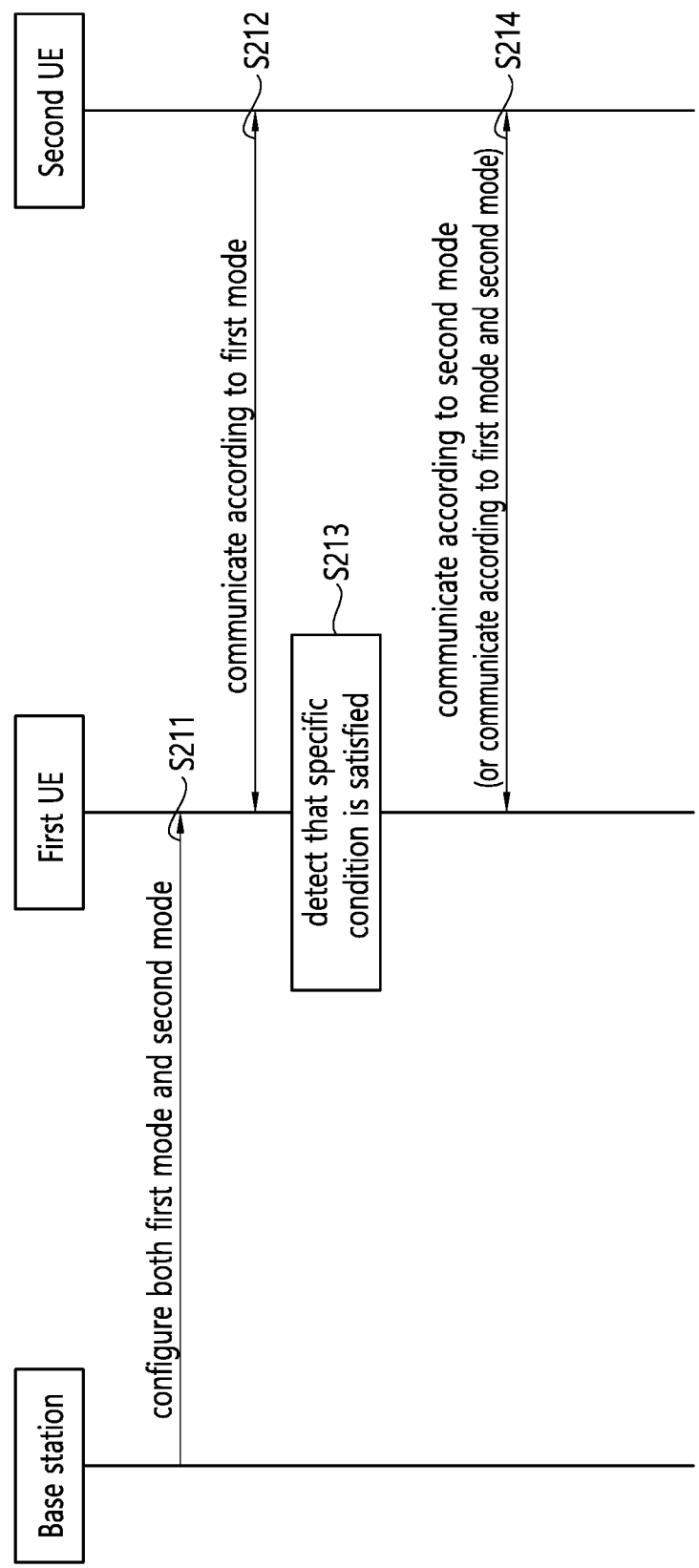
FIG. 21 illustrates an example of an operation between a UEs and a base station operating according to at least one of methods 1 to 4.

FIG. 21 illustrates an example of an operation between a UEs and a base station operating according to at least one of methods 1 to 4.

Referring to FIG. 21, the base station may configure both a first mode and a second mode for a first UE (S211). Although a conventional base stations configures (i.e., selectively configure) the first mode or the second mode for a UE, the base station may configure both the first mode and the second mode in the disclosure. The base station may configure the first mode and the second mode through a higher-layer signal, such as an RRC signal, or a physical-layer signal.

The first UE may communicate with a second UE according to the first mode (S212). The first mode has been described above. The first UE may detect that a specific condition is satisfied while operating in the first mode (S213). The specific condition may be at least one of the foregoing conditions (1) to (6).

In this case, the first UE may communicate with the second UE according to the second mode (or according to the first mode and the second mode) (S214). Here, the UE may operate in the second mode, or may operate in the first mode and the second mode at the same time. A resource pool defined for the first mode and a resource pool defined for the second mode may be shared. Alternatively, the resource pool for the first mode and the resource pool for the second mode are separately defined, but the UE may receive the configured resource pools and may select a pool according to the mode according to the internal configuration of the UE. For example, a first resource pool configured for the first mode, a second resource pool configured for the second mode, and a shared resource pool configured separately from the first resource pool and the second resource pool may be configured. The UE may perform V2X communication according to the first mode in the first resource pool, V2X communication according to the second mode in the second resource pool, and V2X communication according to the first mode and the second mode at the same time in the shared resource pool.

Alternatively, when the specific condition is satisfied, the UE may perform V2X communication according to one selected mode of the first mode and the second mode in the shared resource pool. The shared resource pool may be a separately configured resource pool other than the first resource pool configured for the first mode and the second resource pool configured for the second mode. Alternatively, the shared resource pool may be a resource pool common to the first resource pool and the second resource pool.

The shared resource pool may be the first resource pool configured for the first mode, the second resource pool configured for the second mode, or a resource pool configured separately from the first resource pool and the second resource pool.

It is obvious that examples of the foregoing proposed methods may also be included as implementation methods of the disclosure and may thus be regarded as types of proposed methods. Further, the foregoing proposed methods may be implemented independently, and some of the proposed methods may also be implemented in a combination (or merged form). A rule may be defined such that information indicating whether to apply the proposed methods (or information about rules of the proposed methods) may be indicated from a base station to a UE or from a transmitting UE to a receiving UE through a predefined signal (e.g., a physical-layer signal, for example, signaling through a PDCCH/PDSCH, or a higher-layer signal, for example, an RRC signal).

Figure 22:
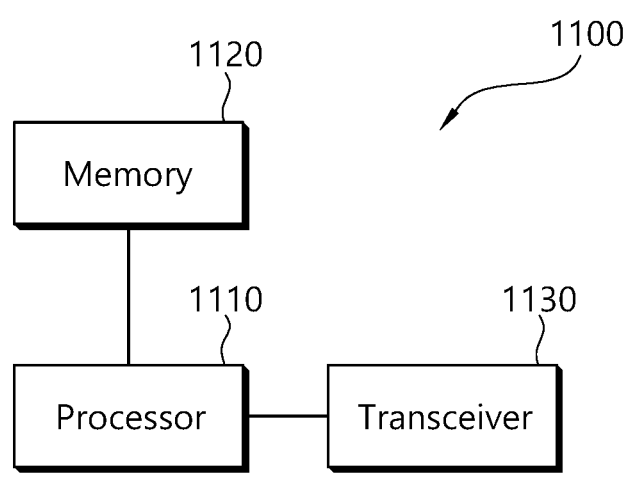
FIG. 22 is a block diagram illustrating a UE to implement an embodiment of the disclosure.

FIG. 22 is a block diagram illustrating a UE to implement an embodiment of the disclosure.

Referring to FIG. 22, the UE 1100 includes a processor 1110, a memory 1120, and a transceiver 1130.

According to an embodiment, the processor 1110 may perform a function/operation/method illustrated in the disclosure. For example, the processor 1110 may receive a signal for configuring a first mode and a second mode from a base station, may perform V2X communication with a different UE according to the first mode, and may perform V2X communication with the different UE according to the second mode or according to the first mode and the second mode when a specific condition is satisfied. The first mode may be a mode of performing V2X communication using a resource scheduled by the base station, and the second mode may be a mode of performing V2X communication using a resource determined by autonomous scheduling by the UE (but the disclosure is not limited thereto).

The memory 1120 may store information/code/command/measurement result, and the like required for UE 1100 operation. The memory 1120 may be connected to the processor 1110.

The transceiver 1130 is connected to the processor 1110 and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include one or more antenna for transmitting and/or receiving radio signals. When the above-described embodiment is implemented in software, the above-described method may be implemented using a module (process or function) which performs the above function. The module may be stored in the memory and executed by the processor. The memory may be disposed to the processor internally or externally and connected to the processor using a variety of well-known means.

Figure 23:
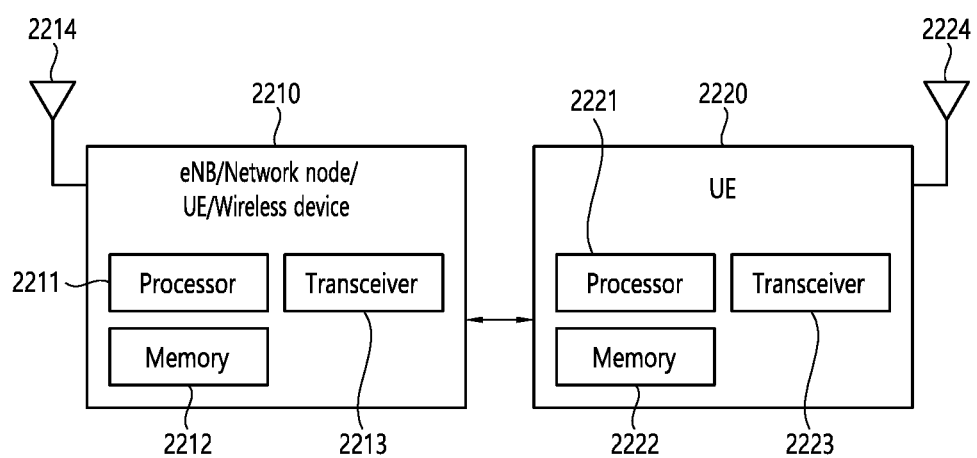
FIG. 23 is a block diagram for an example of a wireless communication device according to an embodiment of the present disclosure.

FIG. 23 is a block diagram for an example of a wireless communication device according to an embodiment of the present disclosure.

Referring to FIG. 23, a wireless communication device may include a base station 2210 and a UE 2220. The UE 2220 may be positioned in the area of the base station 2210. In some scenario, the wireless communication device may include multiple UEs. In the example of FIG. 23, the base station 2210 and the UE 2220 are shown, but the present disclosure is not limited thereto. For example, the base station 2210 may be replaced by another network node, UE, wireless device, or other device.

The base station and the UE may be represented as a wireless communication device or a wireless device, respectively. In FIG. 23, the base station may be replaced by a network node, a wireless device or a UE.

The base station 2210 may include one or more processors including a processor 2211, at least one memory including a memory 2212, and at least one transceiver including a transceiver 2213. The processor 2211 may perform the functions, procedures, and/or methods described above. The processor 2211 may perform one or more protocols. For example, the processor 2211 may perform one or more layers of the wireless interface protocol. The memory 2212 is connected to the processor 2211 and may store various types of information and/or instructions. The transceiver 2213 is connected to the processor 2211 and may be controlled to transmit and receive wireless signals.

The UE 2220 may include at least one processor including a processor 2221, at least one memory device including a memory 2222, and at least one transceiver including a transceiver 2223.

The processor 2221 may perform the functions, procedures, and/or methods described above. The processor 2221 may implement one or more protocols. For example, the processor 2221 may implement one or more layers of a wireless interface protocol. The memory 2222 is coupled to the processor 2221 and may store various types of information and/or instructions. The transceiver 2223 is connected to the processor 2221 and may be controlled to transmit and receive wireless signals.

The memory 2212 and/or the memory 2222 may be coupled internally or externally to the processor 2211 and/or the processor 2221 or may be connected to other processors through a variety of technologies such as wired or wireless connections.

The base station 2210 and/or the UE 2220 may have more than one antenna. For example, antenna 2214 and/or antenna 2224 may be configured to transmit and receive wireless signals.

Figure 24:
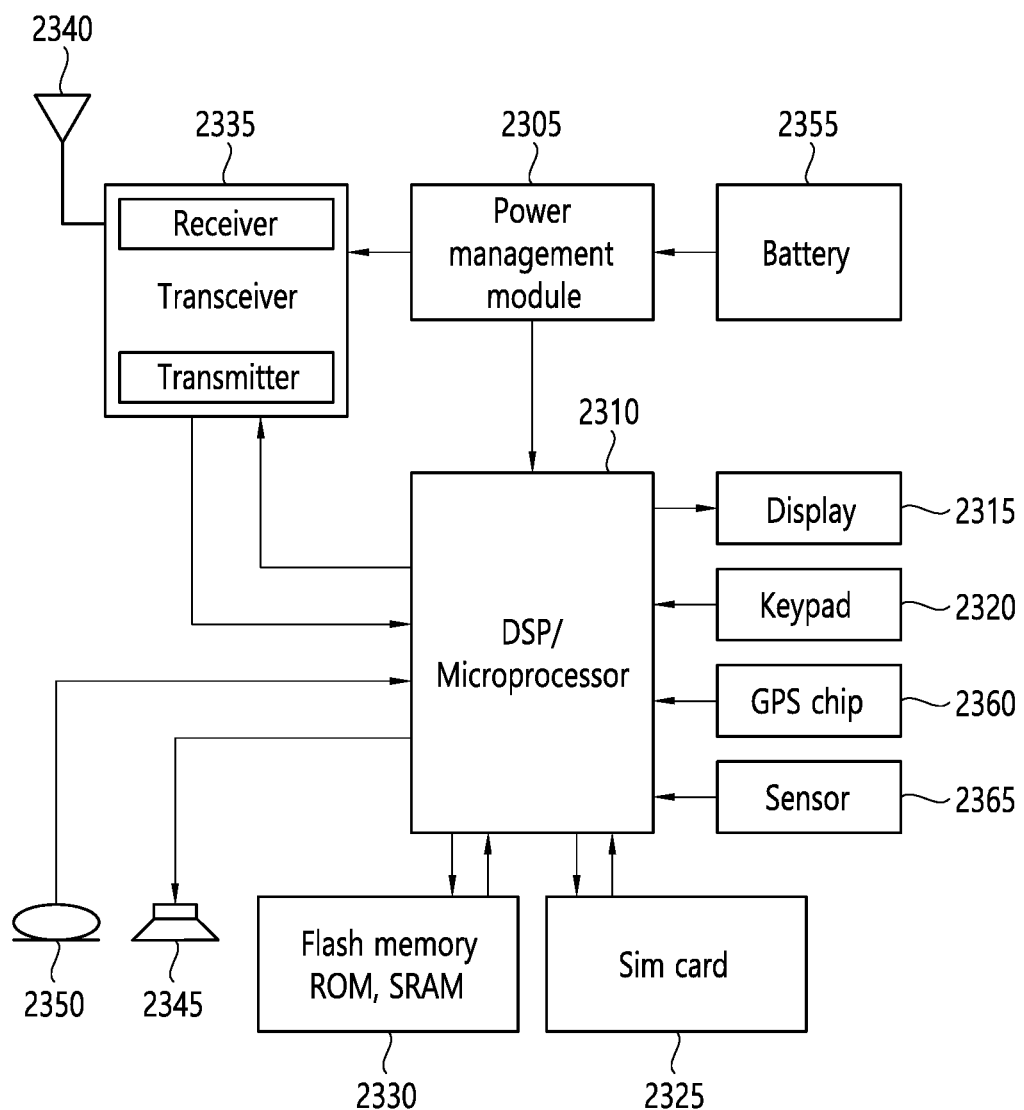
FIG. 24 illustrates an example of a wireless communication device according to an embodiment of the present disclosure.

FIG. 24 illustrates an example of a wireless communication device according to an embodiment of the present disclosure.

FIG. 24 may be a diagram more specifically illustrating the UE 2220 of FIG. 23 above. However, the wireless communication device in FIG. 24 is not limited to the UE 2220. The wireless communication device may be an arbitrary proper mobile computer device configured to perform one or more implementations of the present disclosure such as a vehicle communication system or device, a wearable device, a portable computer, a smart phone, and the like.

Referring to FIG. 24, the UE 2220, like the processor 2310, may include at least one processor (e.g., DSP or microprocessor), a transceiver 2335, a power management module 2305, an antenna 2340, a battery 2355, a display 2315, a keypad 2320, a GPS chip 2360 and sensor 2365, a memory 2330, a subscriber identification module (SIM) card 2325 (this component is optional), a speaker 2345, and a microphone 2350. The UE 2220 may also include a single antenna or multiple antennas.

The processor 2310 may be configured to perform a function, a process, and/or a method described above. According to an implementation example, the processor 2310 may perform one or more protocols like layers of a wireless interface protocol.

The memory 2330 is connected to the processor 2310 to store information related to an operation of the processor 2310. The memory 2330 may be positioned inside or outside the processor 2310 and connected with another processor through various techniques such as wired or wireless connection.

A user may input various types of information (e.g., command information like a telephone number) by pressing the keypad 2320 or by voice activation using the microphone 2350. The processor 2310 receives such command information and processes to perform appropriate functions including dialing a telephone number. As an example, data (e.g., operational data) may be searched from the SIM card 2325 or the memory 2330. As another example, the processor 2310 may receive and process GPS information from the GPS (Global Positioning System) chip 2360 to perform the function related to a position of UE such as vehicle navigation, map service, and the like. As another example, the processor 2310 may display various types of information and data on the display 2315 for the user to recognize and for convenience.

The transceiver 2335 is connected to the processor 2310 to transmit/receive an RF signal. The processor 2310 transfers the command information to the RF module 2335 to initiate communication, for example, to transmit wireless signals including voice communication data. The transceiver 2335 includes a receiver and a transmitter for receiving and transmitting the wireless signals. The antenna 2340 functions to transmit and receive the wireless signals. According to an implementational example, upon receiving the wireless signals, the transceiver 2335 may transfer the signals for processing by the processor 2310 and convert the signals to a baseband. The processed signal may be converted into to audible or readable information output via the speaker 2345 according to various techniques.

According to an implementational example, the sensor 2365 may be connected to the processor 2310. The sensor 2365 may include one or more detection device configured to discover a format of various types of information including a velocity, an acceleration, a light, a vibration, a proximity, a position, an image, but not limited thereto. The processor 2310 may receive and process the sensor information obtained from the sensor 2365 and perform various forms of function such as collision prevention, automatic driving, and the like.

In the example of FIG. 24, various constituent elements (e.g., a camera, a USB port, etc.) may be further included in the UE. For example, the camera may be connected to the processor 2310 and used for various services such as automatic driving, vehicle safety service, and the like.

As such, FIG. 24 is just an example, and the implementation is not limited thereto. For example, some constituent elements (e.g., the keypad 2320, the GPS chip 2360, the sensor 2365, the speaker 2345, and/or the microphone 2350) may not be implemented in a certain scenario.

Figure 25:
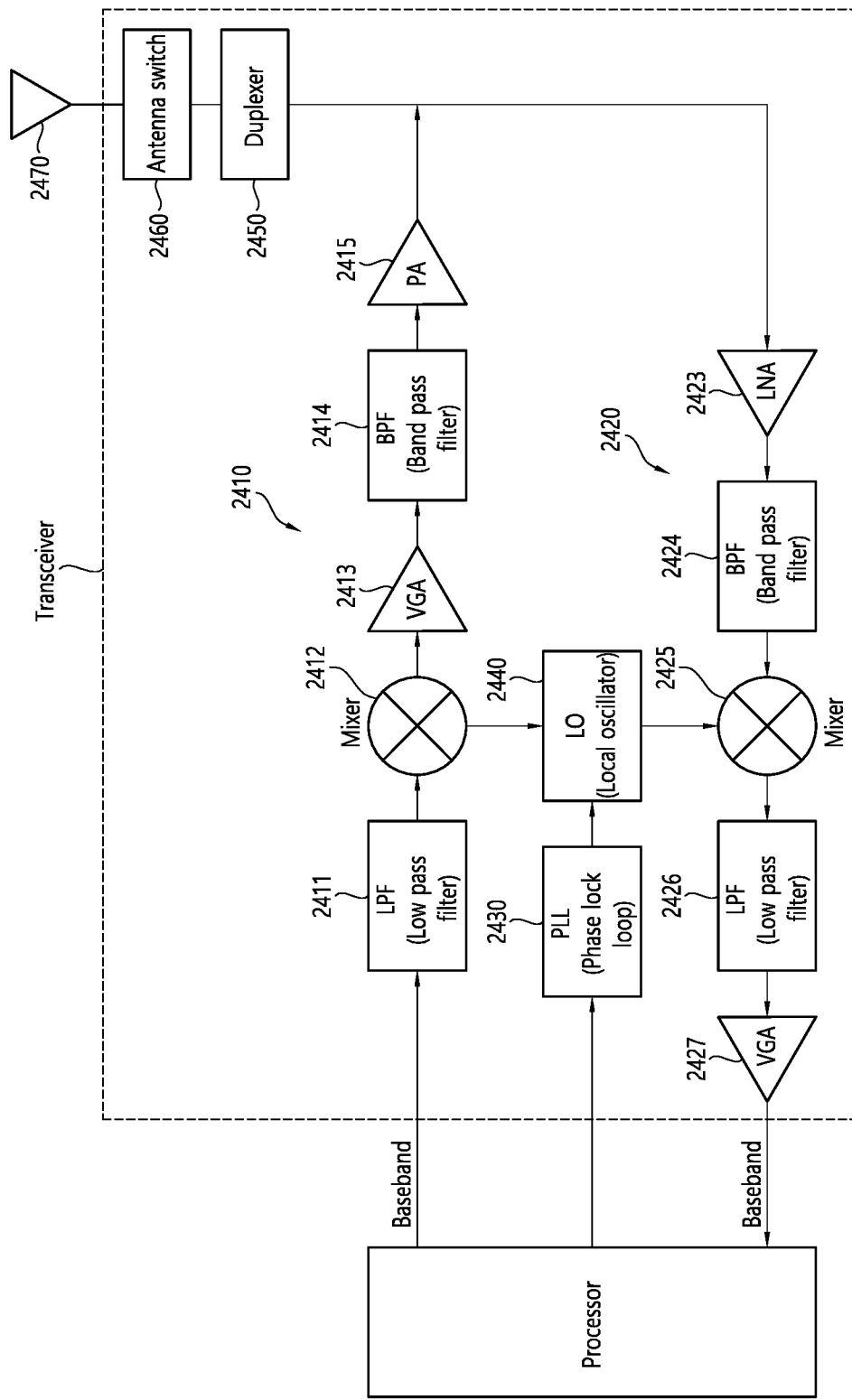
FIG. 25 illustrates an example of a transceiver of a wireless communication device according to an embodiment of the present disclosure.

FIG. 25 illustrates an example of a transceiver of a wireless communication device according to an embodiment of the present disclosure.

For example, FIG. 25 may show an example of a transceiver which may be implemented in frequency division duplex (FDD) system.

In a transmission path, like the processor depicted in FIG. 23 and FIG. 24, at least one processor may process such that data is transmitted and send a signal such as an analogue output signal to the transceiver 2410.

In the example, the analogue output signal in the transceiver 2410, for example, may be filtered by a low pass filter (LPF) 2411 to remove noise due to previous digital-analogue conversion (ADC), upconverted to RF from baseband by the upconverter (e.g., mixer) 2412 and amplified by an amplifier such as a variable gain amplifier 2413. The amplified signal is filtered by a filter 2414, amplified by a power amplifier (PA) 2415, routed through duplexer(s) 2450/antenna switch(es) 2460, and then transmitted through an antenna 2470.

In a reception path, the antenna 2470 receives a signal in wireless environment, and the received signals are routed in the antenna switch(es) 2460/duplexer(s) 2450 and sent to the receiver 2420.

In the above example, the signal received in the receiver 2420 is amplified by an amplifier such as a low noise amplifier (LNA) 2423, filtered by a band pass filter 2424, and down-converted to baseband from RF by a down-converter (e.g., mixer) 2425.

The down-converted signal is filtered by a low pass filter (LPF) 2426, amplified by an amplifier such as VGA 2427 to obtain an analog input signal, and the analog input signal is provided to one or more processors.

Furthermore, a local oscillator (LO) 2440 generates a transmission/reception of LO signal and send it to the upconverter 2412 and the down-converter 2425, respectively.

According to an implementational example, a phase lock loop 2430 may receive control information from the processor and send control signals to a LO generator 2440 to generate transmission/reception of LO signals in an appropriate frequency.

The implementations are not limited to the specific deployment shown in FIG. 25, but various constituent elements and circuits may be differently disposed from the example shown in FIG. 25.

Figure 26:
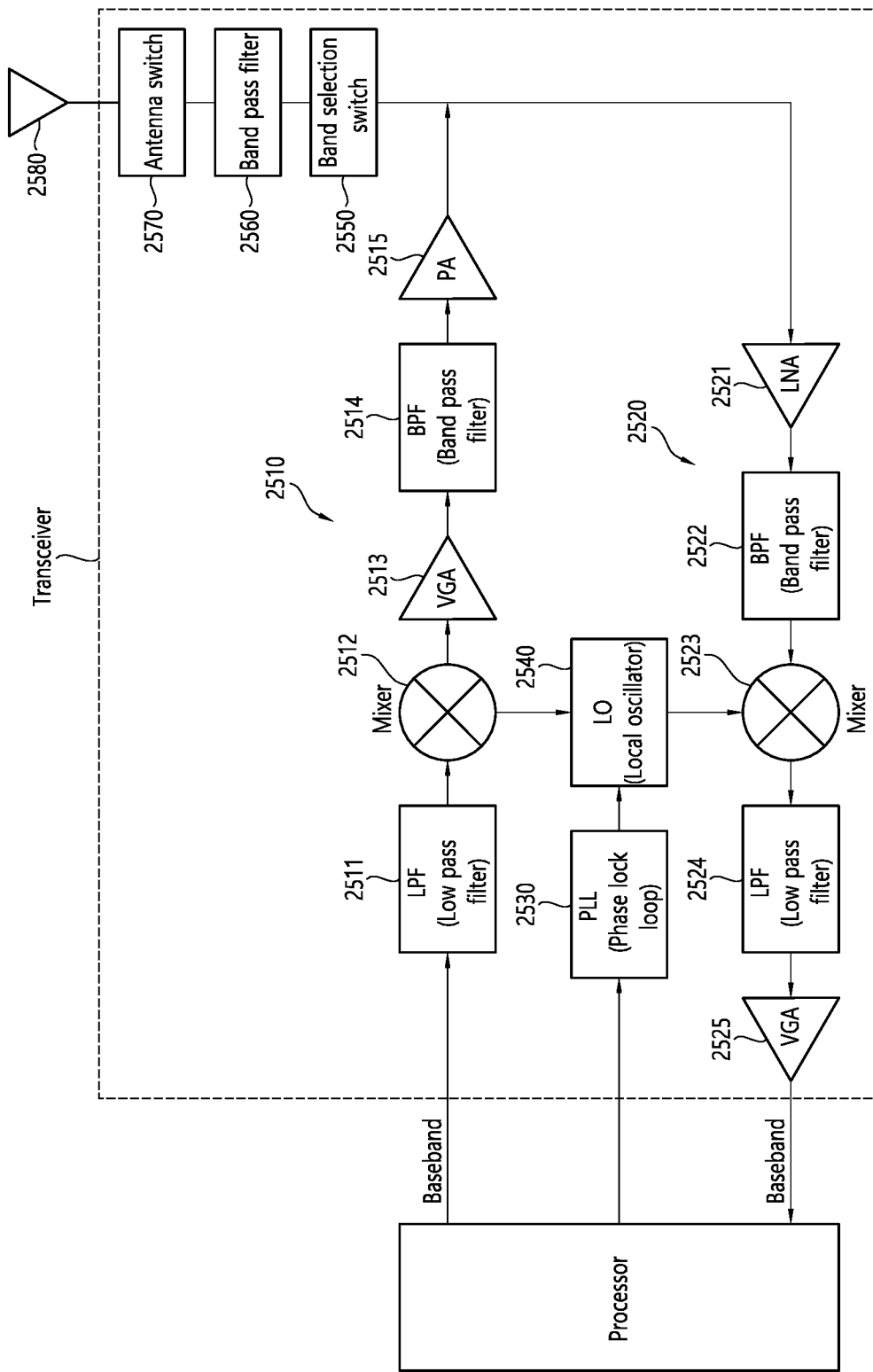
FIG. 26 illustrates another example of a transceiver of a wireless communication device according to an embodiment of the present disclosure.

FIG. 26 illustrates another example of a transceiver of a wireless communication device according to an embodiment of the present disclosure.

For example, FIG. 26 may show an example of a transceiver which may be implemented in time division duplex (TDD) system.

According to an implementational example, a transmitter 2510 and a receiver 2520 of a transceiver of the TDD system may have one or more similar properties to the transmitter and the receiver of the FDD system. Hereinafter, a structure of the transceiver of the TDD system is described.

In a transmission path, a signal amplified by a power amplifier (PA) 2515 of the transmitter is routed through a band selection switch 2550, a band pass filter (BPF) 2560 and an antenna switch(es) 2570 and transmitted to an antenna 2580.

In a reception path, the antenna 2580 receives a signal in wireless environment, and the received signals are routed through the antenna switch(es) 2570, the band pass filter (BPF) 2560 and the band selection switch 2550 and provided to the receiver 2520.

Figure 27:
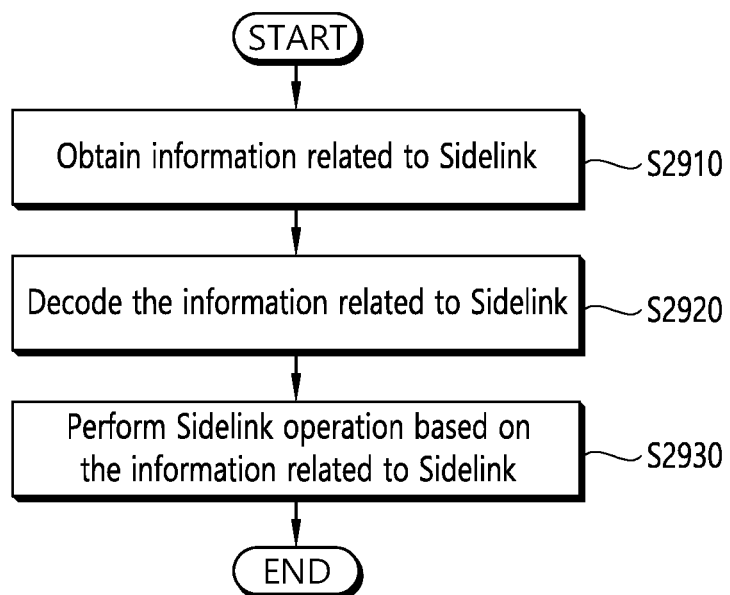
FIG. 27 illustrates a wireless device operation example related to Sidelink communication.

FIG. 27 illustrates a wireless device operation example related to Sidelink communication.

The wireless device operation related to Sidelink described in FIG. 27 is just an example, but Sidelink operations using various techniques may be performed in the wireless device. Sidelink is UE-to-UE interface for Sidelink communication and/or Sidelink discovery. Sidelink may correspond to PC5 interface. In wide meaning, the Sidelink operation may be transmission/reception of information between UEs. Sidelink may deliver various types of information.

In the above example, a wireless device obtains information related to Sidelink (step, S2910). The information related to Sidelink may be one or more resource configurations. The information related to Sidelink may be obtained from another wireless device or a network node.

After obtaining the information, the wireless device decodes the information related to Sidelink (step, S2920).

After decoding the information related to Sidelink, the wireless device performs one or more Sidelink operations based on the information related to Sidelink (step, S2930). Here, the Sidelink operation(s) performed by the wireless device may be one or more operations described herein.

Figure 28:
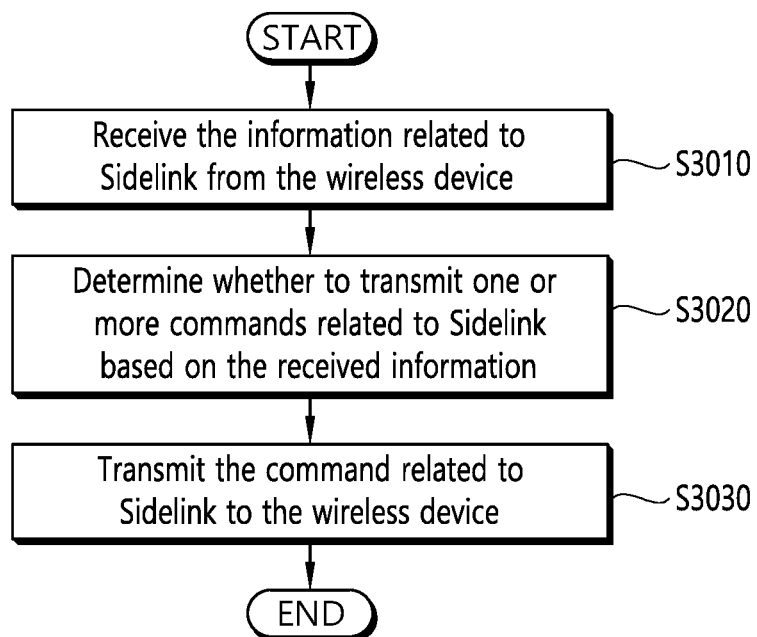
FIG. 28 illustrates a network node operation example related to Sidelink communication.

FIG. 28 illustrates a network node operation example related to Sidelink communication. The network node operation related to Sidelink described in FIG. 28 is just an example, but Sidelink operations using various techniques may be performed in the network node.

The network node receives the information related to Sidelink from the wireless device (step, S3010). For example, the information related to Sidelink may be 'SidelinkUEInformation' used for informing Sidelink information to the network node.

After receiving the information, the network node determines whether to transmit one or more commands related to Sidelink based on the received information (step, S3020).

According to the determination of the network node to transmit the command, the network node transmits the command(s) related to Sidelink to the wireless device (step, S3030). According to an implementational example, after receiving the command transmitted by the network node, the wireless device may perform one or more Sidelink operation(s) based on the received command.

Figure 29:
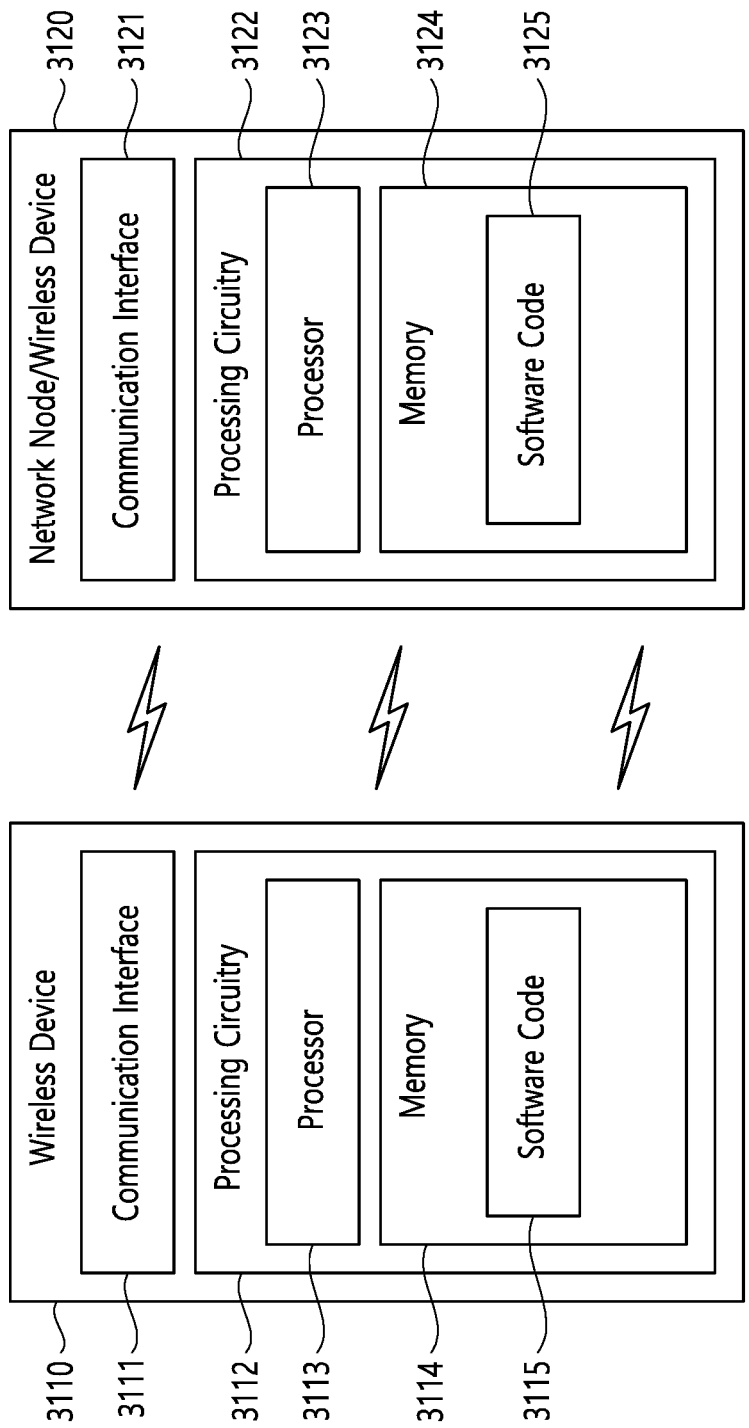
FIG. 29 is a block diagram illustrating an example of implementing a wireless device 3110 and a network node 3120.

FIG. 29 is a block diagram illustrating an example of implementing a wireless device 3110 and a network node 3120. The network node 3120 may be replaced by a wireless device or a UE.

In the example, the wireless device 3110 includes a communication interface 3111 to communicate with one or more other wireless devices, network nodes and/or other elements in the network. The communication interface 3111 may include one or more transmitter, one or more receiver and/or one or more communication interface. The wireless device 3110 includes a processing circuit 3112. The processing circuit 3112 may include one or more processors including a processor 3113 and one or memory including a memory 3114.

The processing circuit 3112 may be configured to control arbitrary methods described in the present disclosure and/or processes and/or for the wireless device 3110 to perform such a method and/or process. The processor 3113 corresponds to one or more processor for performing the wireless device functions described in the present disclosure. The wireless device 3110 includes the memory 3114 configured to store data, program software code and/or other information described in the present disclosure.

According to an implementational example, when one or more processors is executed like the processor 3113, the memory 3114 is configured to store software code 3115 including a command to perform a part or the whole process according to the present disclosure described above.

For example, like the processor 3113, one or more processors that control one or more transceivers like the transceiver 2233 may perform one or more process related to transmission/reception of information to transmit/receive information.

The network node 3120 includes a communication interface 3121 to communicate with one or more other network nodes, wireless devices and/or other elements in a network. Here, the communication interface 3121 includes one or more transmitters, one or more receives and/or one or more communication interfaces. The network node 3120 includes a processing circuit 3122. Here, the processing circuit may include a processor 3123 and a memory 3124.

According to an implementational example, when one or more processors is executed like the processor 3123, the memory 3124 is configured to store software code 3125 including a command to perform a part or the whole process according to the present disclosure.

For example, like the processor 3123, one or more processors that control one or more transceivers like the transceiver 2213 may perform one or more process related to transmission/reception of information to transmit/receive information.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that various modifications and alterations of the present disclosure may be embodied without departing from the concept or the scope of the present disclosure.

The present disclosure has been described with referring to an example applied to the 3GPP LTE/LTE-A system or 5G system (NR system), but the present disclosure may also be applied to other various wireless communication systems.

What is claimed is:

1. A method for sidelink communication in a wireless communication system, the method performed by a user equipment (UE) and comprising:
    receiving a signal for configuring a first mode and a second mode from a base station;
    performing the sidelink communication with a different UE based on the first mode; and
    switching a mode for the sidelink communication with the different UE to the second mode based on a specific condition being satisfied,
    wherein the first mode is a mode of performing the sidelink communication using a resource scheduled by the base station, and the second mode is a mode of performing the sidelink communication using a resource autonomously selected by the UE from an exceptional resource,
    wherein the specific condition is satisfied based on that a time related to a latency requirement of data to be transmitted by the UE to the different UE is shorter than a delay time occurring due to scheduling according to the first mode, and
    wherein based on the specific condition is met, the UE controls a selection window of the second mode for satisfying the latency requirement of data.

2. The method of claim 1, wherein the specific condition is further satisfied based on a delay time for the UE to receive an uplink grant from the base station so that the UE transmits data to the different UE using a resource according to different semi-persistent scheduling (SPS) being greater than a latency requirement of data to be transmitted by the UE to the different UE.

3. The method of claim 1, wherein the exceptional resource is a resource configured to be used when the UE undergoes a radio link failure (RLF) or a hand over (HO).

4. The method of claim 1, wherein the exceptional resource is configured through system information.

5. The method of claim 1,
    wherein, based on the specific condition being satisfied, the UE transmits a mode change request to the base station, and
    wherein, based on the UE receiving a response for the mode change request, the UE starts the sidelink communication with the different UE according to the second mode or according to the first mode and the second mode before receiving a response to the request from the base station.

6. The method of claim 1, wherein, based on the specific condition being satisfied, the UE performs the sidelink communication according to a mode selected from among the first mode and the second mode in a shared resource pool, and the shared resource pool is a first resource pool configured for the first mode, a second resource pool configured for the second mode, or a separately configured resource pool.

7. A user equipment (UE) comprising:
    a transceiver configured to transmit and receive a radio signal; and
    a processor configured to be connected with the transceiver to operate,
    wherein the processor is configured to:
        receive a signal for configuring a first mode and a second mode from a base station;
        perform sidelink communication with a different UE based on the first mode; and
        switch a mode for the sidelink communication with the different UE to the second mode based on a specific condition being satisfied,
    wherein the first mode is a mode of performing the sidelink communication using a resource scheduled by the base station, and the second mode is a mode of performing the sidelink communication using a resource autonomously selected by the UE from an exceptional resource,
    wherein the specific condition is satisfied based on that a time related to a latency requirement of data to be transmitted by the UE to the different UE is shorter than a delay time occurring due to scheduling according to the first mode, and
    wherein based on the specific condition is met, the UE controls a selection window of the second mode for satisfying the latency requirement of data.

8. The UE of claim 7, wherein the specific condition is further satisfied based on a delay time for the UE to receive an uplink grant from the base station so that the UE transmits data to the different UE using a resource according to different semi-persistent scheduling (SPS) being greater than a latency requirement of data to be transmitted by the UE to the different UE.

9. The UE of claim 7, wherein the exceptional resource is a resource configured to be used when the UE undergoes a radio link failure (RLF) or a hand over (HO).

10. The UE of claim 7, wherein the exceptional resource is configured through system information.

11. The UE of claim 7, wherein, based on the specific condition being satisfied, the UE transmits a mode change request to the base station, and based on the UE receiving a response for the mode change request, starts the sidelink communication with the different UE according to the second mode or according to the first mode and the second mode before receiving a response to the request from the base station.

12. The UE of claim 7, wherein, based on the specific condition being satisfied, the UE performs the sidelink communication according to a mode selected from among the first mode and the second mode in a shared resource pool, and the shared resource pool is a first resource pool configured for the first mode, a second resource pool configured for the second mode, or a separately configured resource pool.

* * * * *